United States Patent [19]

Hoyt, Jr. et al.

[11] Patent Number: 4,465,920

[45] Date of Patent: Aug. 14, 1984

[54] ELECTRIC WELDER WITH CURRENT-VOLTAGE FEEDBACK CIRCUIT THAT PROVIDES DESIRED SLOPE CURVE

[75] Inventors: Harold C. Hoyt, Jr., St. Louis, Mo.; William J. Greene, Warren, N.J.

[73] Assignee: Teledyne-Walterboro, a Division of Teledyne Industries, Inc., Calif.

[21] Appl. No.: 255,354

[22] Filed: Apr. 20, 1981

Related U.S. Application Data

[62] Division of Ser. No. 944,962, Sep. 22, 1978, Pat. No. 4,293,756.

[51] Int. Cl.³ .............................................. B23K 9/10
[52] U.S. Cl. ............................... 219/133; 219/130.33; 322/25
[58] Field of Search ................... 219/133, 134, 130.33, 219/130.32, 130.01; 322/25, 59, 60

[56] References Cited

U.S. PATENT DOCUMENTS

| | | | |
|---|---|---|---|
| 2,228,436 | 1/1941 | Blankenbuehler | 322/60 |
| 2,458,658 | 1/1949 | Tyrner | 322/25 |
| 2,620,465 | 12/1952 | Giroz | 219/130.33 |
| 3,530,359 | 9/1970 | Grist | 219/130.32 |
| 3,535,491 | 10/1970 | Krolski | 219/130.01 |
| 3,912,980 | 10/1975 | Crump et al. | 219/130.33 |

Primary Examiner—C. C. Shaw
Attorney, Agent, or Firm—Rogers, Eilers & Howell

[57] ABSTRACT

A D.C. welder includes an engine-driven D.C. generator, a polarity-reversing switch which can change the direction of current flow through the field winding of that generator to provide a positive or negative polarity at the welder output terminals, a circuit that automatically permits only uni-directional current flow through that field winding during the starting of the engine, and a further circuit that energizes a solenoid to close contacts which enable that generator to operate as the starting motor for that engine but which thereafter de-energizes that solenoid and then keeps it de-energized until the engine is at, or close to, rest.

10 Claims, 8 Drawing Figures

ELECTRIC WELDER WITH CURRENT-VOLTAGE FEEDBACK CIRCUIT THAT PROVIDES DESIRED SLOPE CURVE

This application is a division of application Ser. No. 944,962, filed Sept. 22, 1978 now U.S. Pat. No. 4,293,756.

SUMMARY OF THE PRESENT INVENTION

The present invention provides a D.C. welder which has an engine-driven D.C. generator. A polarity-reversing switch can change the direction of current flow through the field winding of that generator to provide a positive or negative polarity at the welder output terminals. A circuit automatically permits only uni-directional current flow through that field winding during the starting of the engine, and thereby enables that generator to operate as the starting motor for that engine. It is, therefore, an object of the present invention to provide a D.C. welder which includes an engine-driven D.C. generator, a polarity-reversing switch which can change the direction of current flow through the field winding of that generator to provide a positive or negative polarity at the welder output terminals, and a circuit that automatically permits only uni-directional current flow through that field winding during the starting of the engine.

A solenoid can be energized to close contacts which will connect a battery to the armature of the generator to enable that generator to operate as the starting motor of the engine during the starting of that engine. A circuit automatically permits that solenoid to be energized during the starting of that engine, but positively de-energizes that solenoid, and then prevents energization of that solenoid, when that engine reaches a predetermined speed. In doing so, that circuit prevents the injury to that battery and also prevents the injury to that generator which could occur if those contacts were closed to connect that battery to that armature while that generator was providing welding current. It is, therefore, an object of the present invention to provide a solenoid that can be energized to close contacts which will connect a battery to the armature of a generator to enable that generator to operate as the starting motor of an engine during the starting of that engine and to provide a circuit which automatically permits that solenoid to be energized during the starting of that engine but positively de-energizes that solenoid, and then prevents energization of that solenoid, when that engine reaches a predetermined speed.

The welder has a circuit which controls the amount of current that can flow through the field winding of the generator. That circuit provides maximum current flow through that field winding during the starting of the engine so the generator can provide maximum starting torque for that engine; but that circuit becomes inactive after the engine reaches a pre-set speed. Thereafter, further circuits can control the amount of current flowing through the field winding. It is, therefore, an object of the present invention to provide a circuit which controls the amount of current that can flow through the field winding of the generator of a welder, which provides maximum current flow through that field winding during the starting of the engine, and which becomes inactive after the engine reaches a pre-set speed.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claims.

DETAILED DESCRIPTION OF PREFERRED EMBODIMENT

Mechanical and Electro-Mechanical Components

Figure 1:
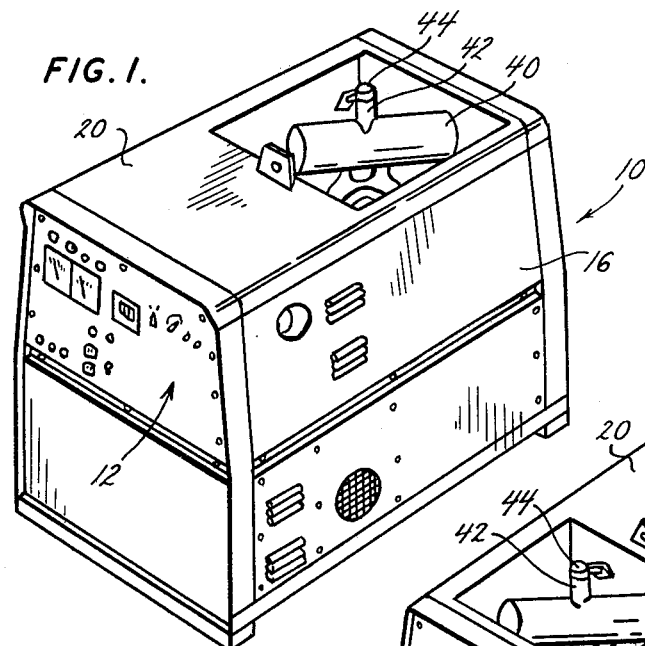
FIG. 1 is a perspective view of one preferred embodiment of electric welder that is made in accordance with the principles and teachings of the present invention.
Figure 2:
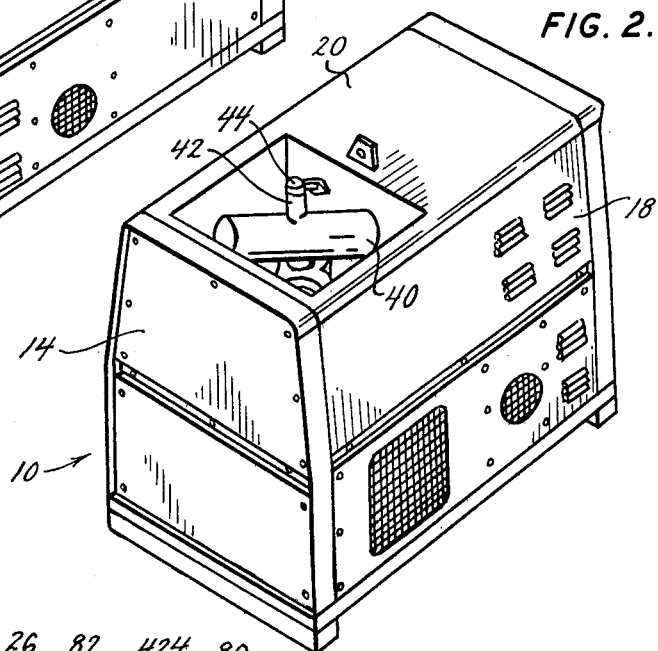
FIG. 2 is a further perspective view of the electric welder of FIG. 1, but it shows that welder after it has been rotated one hundred and eighty degrees about a vertical axis.

Referring to the drawing in detail, the numeral 10 generally denotes one preferred embodiment of electric welder that is made in accordance with the principles and teachings of the present invention. That welder has a housing which has a front panel 12, a rear panel 14, side panels 16 and 18, and a top panel 20. Those side panels have louvers and screened openings therein to permit ready ingress or egress of air; and the top panel has a large unobstructed opening adjacent one end thereof. A partition 22 and a partition 24 generally subdivide the interior of the housing for the welder 10 into three compartments. A generator 50 and an alternator 58 are disposed within the center compartment, an internal combustion engine 56 and an alternator 60 are disposed in one of the end compartments, and a fuel tank 25 and a storage battery 62 are located in the other end compartment. The partition 24 has vertically-directed slots, not shown, therein to accommodate belts which extend between the pulleys on the end of the crank shaft of engine 56 and pulleys on the ends of the armatures of generator 50 and of alternator 58. The partition 22 is substantially devoid of openings that could permit air to pass freely between the compartments which are separated by that partition.

Figure 4:
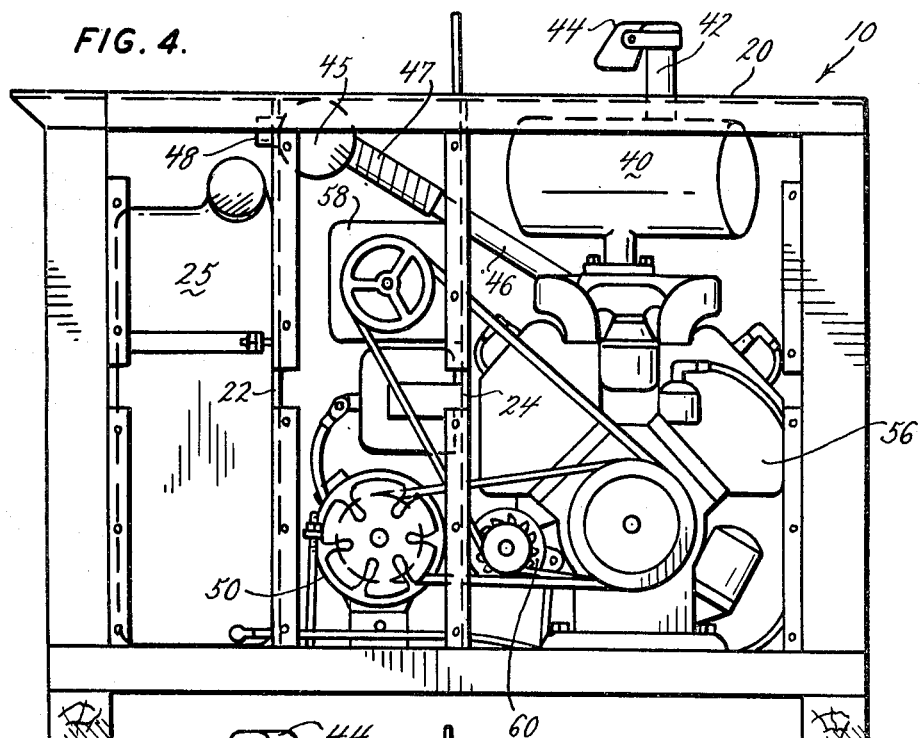
FIG. 4 is an elevational view, on a scale intermediate those of FIGS. 1 and 3, which shows some of the components of the electric welder after a side panel has been removed.
Figure 5:
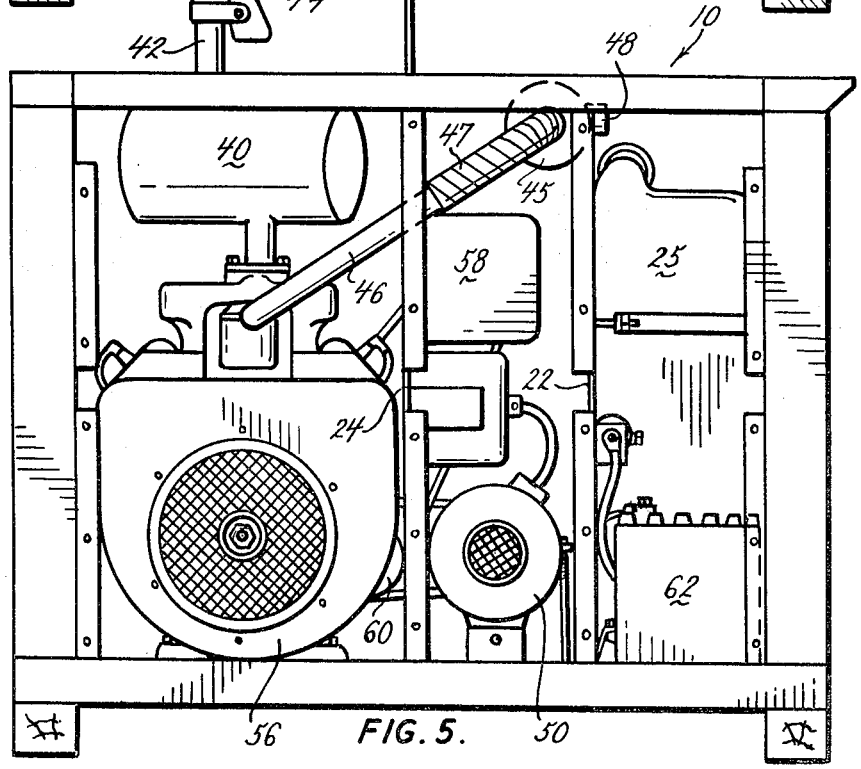
FIG. 5 is an elevational view, on the scale of FIG. 4, of the opposite side of the electric welder of FIGS. 1 and 2 after the panel for that side has been removed.

The engine 56 has a muffler 40, an exhaust pipe 42, and a movable rain-excluding cover 44. As shown by FIGS. 4 and 5, that exhaust pipe and that rain-excluding cover extend upwardly through the large opening in the top panel 20. The air filter for engine 56 is denoted by the numeral 45; and it is located in the center compartment at a point above the level of alternator 58. The air duct 46 extends from the air intake of engine 56 to and through the partition 24; and a flexible air duct 47 extends from the end of air duct 46 to the outlet of air filter 45. The inlet 48 of that air filter extends through partition 22 adjacent the top of that partition to communicate with the atmosphere above the fuel tank 25.

During the operation of the engine 56, the air which is drawn into the air intake of that engine will pass through the inlet 48 of air cleaner 45, through that air cleaner, through flexible air duct 47, and then through the air duct 46 to that air intake. Because the air inlet 48 communicates with the compartment in which the fuel tank 25 and battery 62 are located, four important benefits are attained. First, any vaporized fuel from that fuel tank will be drawn away from that fuel tank and out of the fuel tank compartment to engine 56—with consequent utilization of that fuel vapor, and also with consequent minimization of the risk of fire due to fuel vapor in that compartment. Second, any combustible gas, such as hydrogen, from the battery 62 will be drawn away from that battery and out of the fuel tank compartment to engine 56—with consequent utilization of that gas, and also with consequent minimization of the risk of fire due to combustible gas in that compartment. Third, the air within the fuel tank compartment usually will be freer of dust than the ambient air. Fourth, the drawing of air from the fuel tank compartment will tend, on hot days, to reduce the temperature within that compartment, and hence will tend to minimize vaporization of the fuel within fuel tank 25. As a result, the welder provided by the present invention can be operated more efficiently on hot days—even when it is mounted in the back of a pickup truck, and hence is exposed to direct rays from the sun.

GENERATOR AND ALTERNATORS

Referring to the drawing in detail, power ground is denoted by a triangle and signal ground is denoted by several horizontal lines which generally define a triangle. The generator 50 preferably is a D.C. generator which is produced by Teledyne Waterboro and which is substantially identical to a prior D.C. generator that Teledyne Waterboro has manufactured and sold for a number of years under the designation Teledyne 676050 or Ordnance Part Number 10898795. The significant difference between generator 50 and that prior generator is the mounting of the brushes—the brushes in generator 50 being circumferentially adjustable whereas the brushes in that prior generator are fixed. Less significant differences between generator 50 and that prior generator are differences in the end bells and in the fans, and the use of differing number of bolts. The armature of generator 50 is denoted by the numeral 52 in FIG. 6B; and the field winding of that generator is denoted by the numeral 54.

The pulleys and belts which connect the crankshaft of engine 56 to the armature 52 enable that armature to drive, and to be driven by, that crankshaft. Further pulleys and a further belt enable that crankshaft to drive alternator 58 and alternator 60. Although different engines could be used as the engine 56, a Teledyne Wisconsin VH4D aircooled engine is very useful. The alternator 58 is used to supply power for polishing tools and the like; and it will preferably be a standard one hundred and fifteen volt A.C., sixty Hertz, two kilowatt or three kilowatt alternator. The alternator 60, and the rectifier therein, are used to charge the battery 62; and it will preferably be a standard, rectifier-equipped automotive alternator that provides twelve volts D.C. The battery 62 can supply power to armature 52 and to field winding 54 to enable generator 50 to serve as the starting motor for engine 56.

Figure 6A:
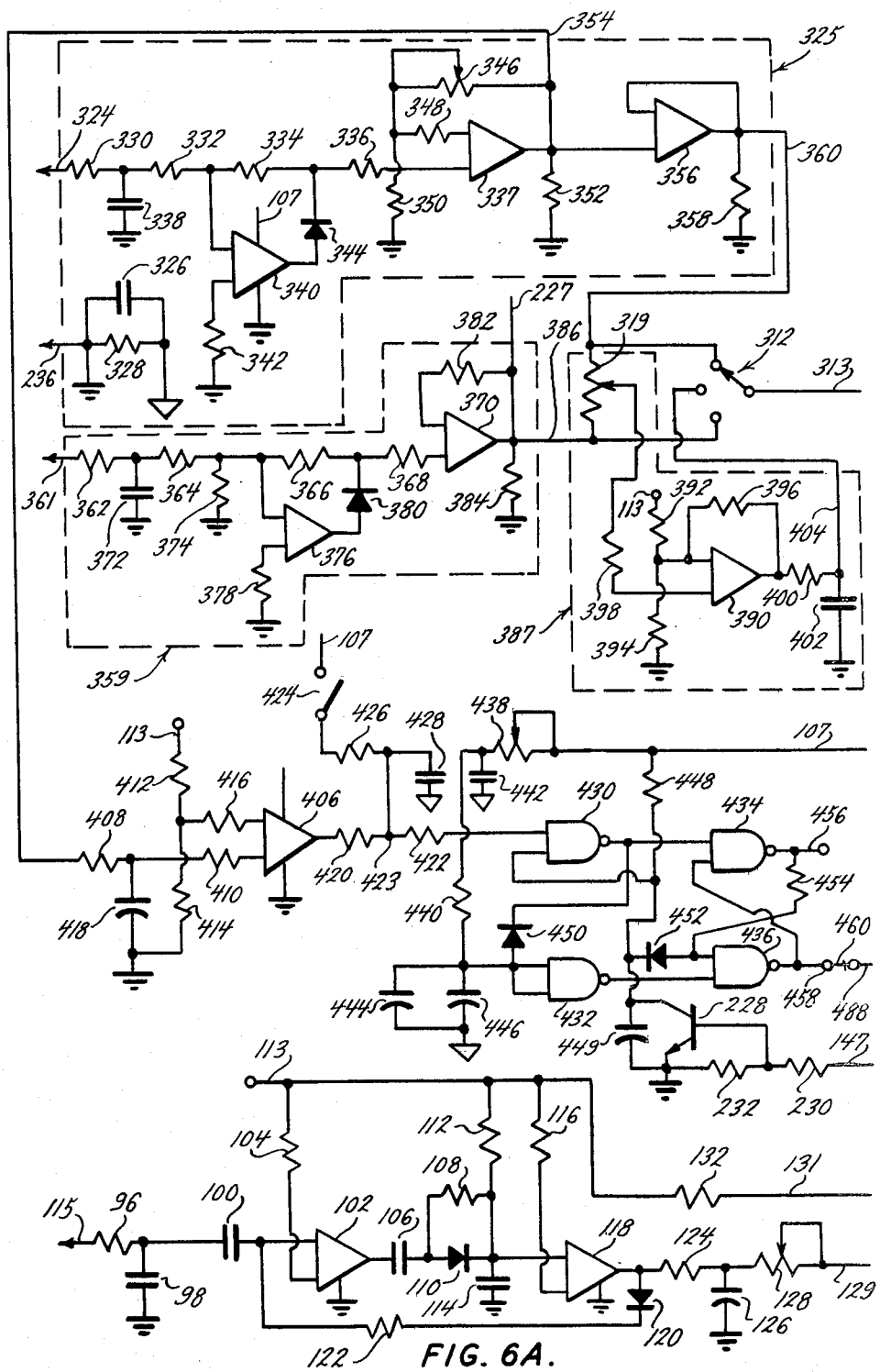
FIG. 6A is a schematic diagram of some of the components and connections of the electric welder of FIGS. 1 and 2.
Figure 6B:
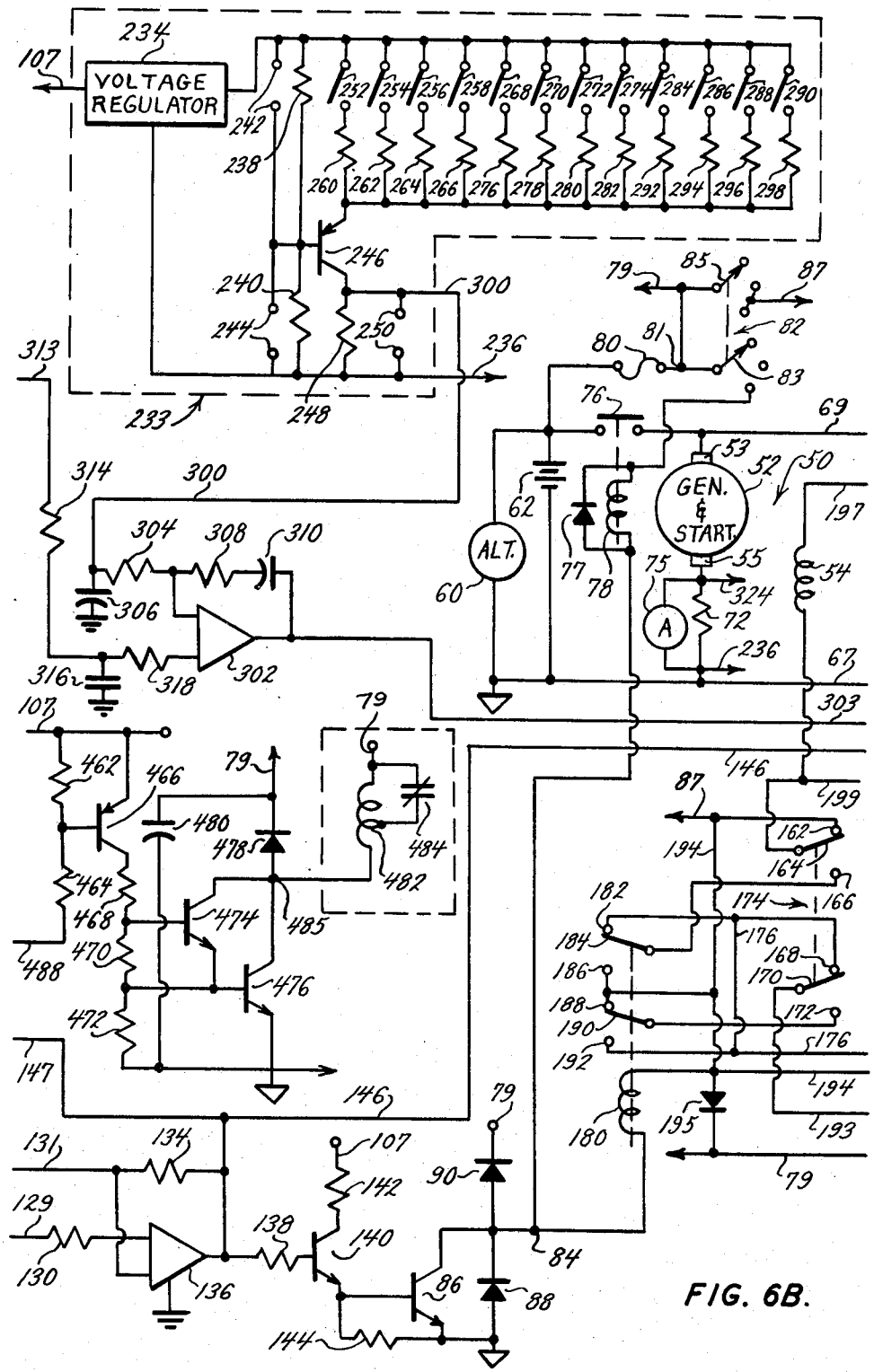
FIG. 6B is a schematic diagram of further of the components and connections of that electric welder.
Figure 6C:
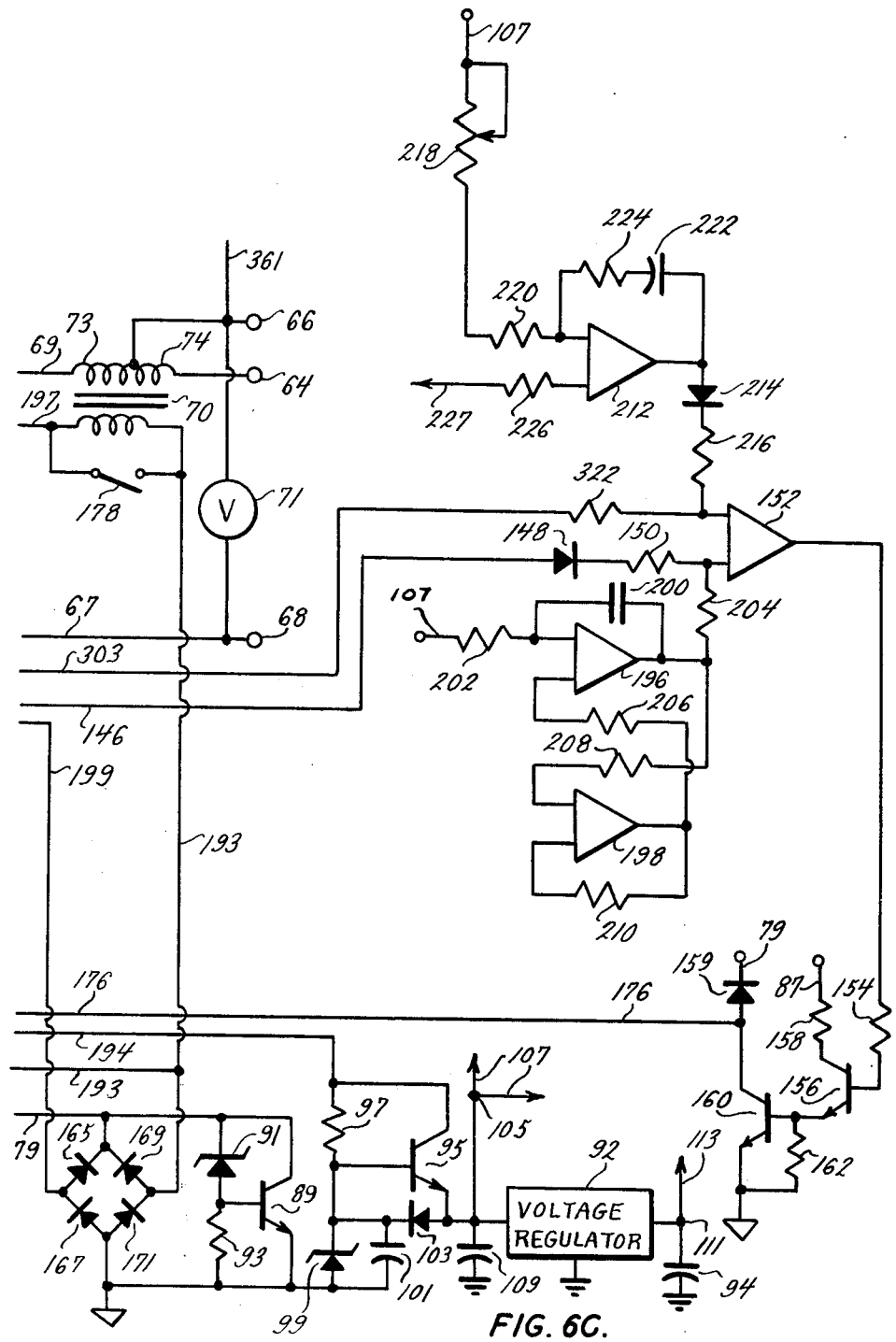
FIG. 6C is a schematic diagram of the rest of the components and connections of that electric welder.

The numerals 64, 66 and 68 in FIG. 6C denote the output terminals of the welder provided by the present invention. A conductor 69 and a portion 73 of the tapped primary winding of a rate transformer 70 in FIG. 6C connect generator brush 53, which bears against the commutator of armature 52, to output terminal 66; and that conductor and that portion plus the other portion 74 of that tapped primary winding connect that brush to output terminal 64. A low resistance "shunt" 72 in FIG. 6B, for a D.C. ammeter 75, connects generator brush 55, which also bears against the commutator of armature 52, to output terminal 68 via a conductor 67. If desired, the output terminal 64 and the portion 74 of the tapped primary winding 70 could be eliminated; and, in that event, all values of welding current would be supplied by output terminals 66 and 68. A D.C. voltmeter 71 is connected to output terminals 66 and 68, as shown by FIG. 6C.

Figure 3:
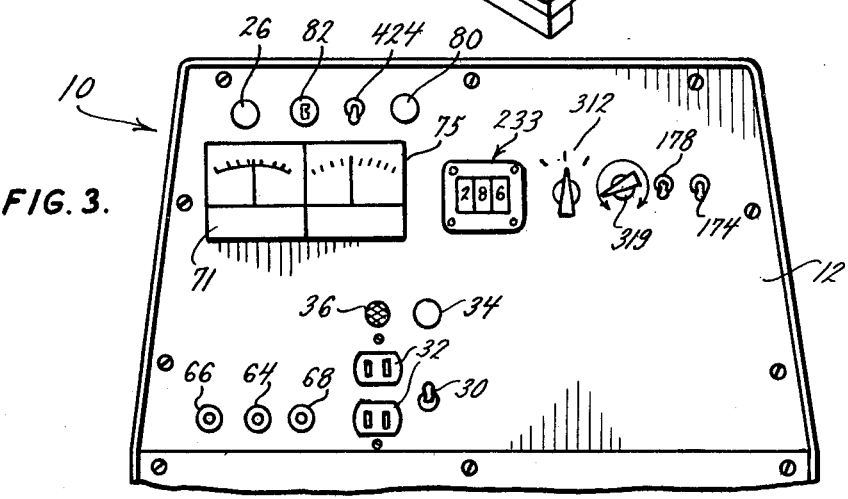
FIG. 3 is a view, on a larger scale, of the control panel of the electric welder of FIGS. 1 and 2.

The alternator 58 has a field winding and a solid state rectifier regulator which can be connected to, or disconnected from, the duplex outlet receptacle 32 in FIG. 3 by a switch 30. When that switch is "open", that field winding will be de-energized, and hence that alternator will be unable to generate any power. When that switch is closed, that field winding can be energized or self-excited by the alternator output through that solid state rectifier regulator; and that solid state rectifier regulator will vary the field winding current to maintain the desired output voltage. A fuse 34 is connected between the output of alternator 58 and the duplex outlet receptacle 32. A lamp 36 is normally dark but will become illumined to indicate when that alternator is supplying power to that duplex outlet receptacle.

ENGINE-STARTING SYSTEM

As shown by FIG. 6B, the positive terminal of battery 62 is connected to one contact 76 of a solenoid switch of the type used in engine-starting circuits of trucks and automobiles. The other contact 76 is connected to brush 53 of generator 50; and hence, whenever the contacts 76 are closed, current will flow from the positive terminal of battery 62 through contacts 76, through armature 52, and through shunt 72 to power ground—and hence to the negative terminal of that battery. The coil of the solenoid switch is denoted by the numeral 78; and an energy-dissipating diode 77 is connected in parallel with that solenoid.

The numeral 80 denotes a fuse which connects the positive terminal of battery 62 to a junction 81 at the input of a key-operated off-on-start switch 82 of the type used in trucks and automobiles. A movable contact 83 of that switch normally is in an "off" position, but it can be moved to a "start" position to cause current to flow from the positive terminal of battery 62 via fuse 80, junction 81, that movable contact, the adjacent stationary "start" contact, solenoid coil 78, a junction 84, and the collector-emitter circuit of an NPN transistor 86 to power ground. A diode 88 and a diode 90 are connected in series between power ground and junction 81 by a conductor 79; and the cathode of diode 88 and the anode of diode 90 are connected to the collector of transistor 86. Those diodes will protect that transistor against injury due to inductive transients. The transistor 86 is conductive, and hence solenoid coil 78 can be energized, only during the starting of engine 56—all as explained hereinafter in the Solenoid Disconnecting Circuit section. The other movable contact 85 of switch 82 normally is in an "off" position, but it can be moved into engagement with the run-start contact of that switch to connect junction 81 to the ignition system of engine 56 and to other portions of the overall circuit for the welder by a conductor 87.

An NPN transistor 89 in FIG. 6C is connected between junction 81 and power ground by conductor 79; and, similarly, a series-connected Zener diode 91 and a resistor 93 are connected between that junction and power ground by that conductor. The junction between Zener diode 91 and resistor 93 is connected to the base of transistor 89. That transistor, Zener diode and resistor constitute a clipping circuit which is connected in parallel with battery 62; and it is intended to shunt to ground any transients which appear at junction 81 and which have a value in excess of twenty volts plus the base-emitter voltage drop of transistor 89. Specifically, Zener diode 91 normally is non-conductive, and hence transistor 89 also is normally non-conductive. However, in the event a transient develops at junction 81, which has a value greater than twenty volts plus the base-emitter voltage drop of transistor 89, Zener diode 91 will become conductive. The resulting flow of current through the base-emitter circuit of transistor 89 will render that transistor conductive; and, thereupon, the collector-emitter circuit of that transistor will pass that transient to power ground.

An NPN transistor 95, a resistor 97, a Zener diode 99, a capacitor 101, a diode 103 and a capacitor 109 constitute a limiter which is connected between the run-start contact of switch 82 and power ground by conductor 87 and a conductor 194. That limiter is intended to pass to power ground substantially all transients which appear at that contact. Specifically, resistor 97 forward biases transistor 95 to render that transistor conductive; and hence any transients which appear at the run-start contact of switch 82 will tend to be passed to ground via conductors 87 and 194 and the collector-emitter circuit of transistor 95 and then, in parallel relation, via capacitor 109 and also diode 103 and capacitor 101. In the event any such transient had a value greater than fifteen volts, the normally non-conductive Zener diode 99 would become conductive; and, thereupon, resistor 97 and Zener diode 99, as well as the collector-emitter circuit of transistor 95, capacitor 109, and diode 103 and capacitor 101, would pass that transient to power ground. As a result the emitter of transistor 95 can supply twelve volts D.C., which is effectively free of transients, to the input of a regulator 92 and, via a junction 105 and a branched conductor 107, to various points in the overall welder circuit.

The regulator 92 has the "ground" terminal thereof connected to signal ground, and has the output thereof spaced from ground by a capacitor 94. That regulator will provide a regulated eight volts D.C. to a junction 111 adjacent its output and, via a conductor 113, to various points in the overall welder circuit.

SOLENOID DISCONNECTING CIRCUIT

At "start up" of the welding system, the transistor 86 in FIG. 6B will be forward biased by the Solenoid Disconnecting Circuit which is shown in FIG. 6A and which includes a conductor 115, a resistor 96, and capacitors 98 and 100 that can couple pulses, from the "breaker" points of the ignition system of engine 56, to the inverting input of a Norton amplifier 102 while by-passing any high frequency transients to signal ground. The output of that Norton amplifier is coupled to the inverting input of a Norton amplifier 118 by a capacitor 106 and a resistor 108 which has a diode 110 connected in parallel with it. The output of Norton amplifier 118 is fed back to the inverting input of Norton amplifier 102 by a diode 120 and a resistor 122; and that output also is integrated by a resistor 124 and a capacitor 126. An adjustable resistor 128, a conductor 129, and a resistor 130 connect the ungrounded terminal of capacitor 126 to the inverting input of a Norton amplifier 136 in FIG. 6C. A resistor 138 connects the output of Norton amplifier 136 to the base of an NPN transistor 140 which has the emitter thereof connected to the base of transistor 86. The remaining components of the Solenoid Disconnecting Circuit are resistor 104, 112, 116, 132, 134, 142 and 144, capacitor 114, and a conductor 131. Conductor 113 in FIG. 6A and the resistors 104, 116 and 132 connect the non-inverting inputs of Norton amplifiers 102, 118 and 136 to the regulated eight volts D.C. at the output of regulator 92 in FIG. 6C. Pins 14 of those Norton amplifiers are connected directly to that regulated eight volts D.C. by conductor 113 and by connections, not shown; and pins 7 of those Norton amplifiers are connected directly to signal ground. Conductor 113 and resistor 112 connect the inverting input of Norton amplifier 118 directly to the regulated eight volts D.C.; and capacitor 114 is connected between that input and signal ground. Resistor 134 connects the output of Norton amplifier 136 to the non-inverting input of that Norton amplifier. Resistor 142 and conductor 107 connect the collector of transistor 140 to the junction 105 via conductor 107 and hence to essentially transient-free twelve volts D.C.; and resistor 144 connects the emitter of that transistor to power ground.

When engine 56 is at rest, the "breaker" points of the ignition system of that engine wil not develop, and hence will not supply, pulses for the Solenoid Disconnecting Circuit. However, when the crankshaft of that engine is rotating, those "breaker" points will supply pulses to resistor 96 in FIG. 6A via conductor 115. Capacitor 100 will couple those pulses to a one shot multivibrator which includes the Norton amplifiers 102 and 118, resistors 104, 108, 112, 116 and 122, capacitors 106 and 114, and diodes 110 and 120. That multivibrator will respond to each pulse from the "breaker" points to provide an output pulse which has a predetermined amplitude and a predetermined width; and that multivibrator will apply those output pulses to the integrator which is constituted by resistor 124 and capacitor 126. The regulated eight volts, which conductor 113, resistor 132 and conductor 131 apply to the non-inverting input of Norton amplifier 136 in FIG. 6B, will tend to cause the output of that amplifier to be a logic "1". Consequently, until the value of the voltage at the inverting input of that amplifier exceeds the value of the voltage at that non-inverting input, that output will be a logic "1". As the engine 56 is being started, the one shut multivibrator will respond to the pulses from the "breaker" points to apply output pulses to the integrator; and adjustable resistor 128, conductor 129, and resistor 130 will respond to the consequent increase in voltage at the upper terminal of capacitor 126 to apply a signal to the inverting input of Norton amplifier 136. When the movable contact of that adjustable resistor is at one end of its path of adjustment, the engine crankshaft will have to rotate at eleven hundred or more revolutions per minute before the voltage at the inverting input of Norton amplifier 136 can exceed the value of the voltage at the non-inverting input of that amplifier. However, when that movable contact is at the other end of its path of adjustment, the engine crankshaft need only rotate at two hundred revolutions per minute to cause the voltage at the inverting input of Norton amplifier 136 to exceed the value of the voltage at the non-inverting input of that amplifier. Usually that movable contact will be set so the voltage at the inverting input of Norton amplifier 136 will exceed the value of the voltage at the non-inverting input of that amplifier when the crankshaft reaches about three hundred revolutions per minute. Once the voltage at the inverting input of Norton amplifier 136 exceeds the value of the voltage at the non-inverting input of that amplifier, the output of that amplifier will change from a logic "1" to a logic "0".

All of this means that whenever the engine 56 is at rest or is operating at less than a predetermined speed, the Norton amplifier 136 will be applying a logic "1" to the base of transistor 140 via resistor 138, to the non-inverting input of a Norton amplifier 152 in FIG. 6C via a conductor 146, a diode 148 and a resistor 150, and to the base of an NPN transistor 228 in FIG. 6A via a conductor 147 and a resistor 230. Transistors 140 and 228 will respond to that logic "1" to be conductive at the saturation level; and Norton amplifier 152 will respond to that logic "1" to provide a logic "1" at the output thereof. The significance of the conducting of transistor 228 at the saturation level and the development of the logic "1" at the output of Norton amplifier 152 will be explained in subsequent sections. The conducting of transistor 140 at the saturation level will cause transistor 86 to conduct at the saturation level. Consequently, whenever the engine 56 is at rest or is operating at less than a predetermined speed, transistor 86 will permit solenoid coil 78 to be energized by the shifting of switch contact 83 to the "start" position. Also whenever the engine 56 is at rest or is operating at less than a predetermined speed, transistor 86 will permit current to flow from the "run-start" contact of switch 82 via conductors 87 and 194 in FIG. 6B, a relay coil 180, junction 84, and the collector-emitter circuit of transistor 86 to power ground. The significance of the energization of that relay coil will be explained in a subsequent section.

As soon as the crankshaft of the engine 56 reaches a speed at which the capacitor 126, adjustable resistor 128 and resistor 130 in FIGS. 6A and 6B make the voltage at the inverting input of Norton amplifier 136 exceed the value of the voltage at the non-inverting input of that amplifier, the output of that amplifier will change from a logic "1" to a logic "0". Thereupon the forward biases on transistors 140 and 228 in FIGS. 6A and 6B will disappear and both of those transistors will become non-conductive. The logic "0" at the output of Norton amplifier 136 will back-bias diode 148 in FIG. 6C; and hence the output of that amplifier will no longer affect the non-inverting input of Norton amplifier 152 in FIG. 6C. As transistor 140 becomes non-conductive, the forward bias for transistor 86 will disappear; and hence that transistor also will become non-conductive. At this time, solenoid coil 78 and relay coil 180 will be isolated from power ground; and hence that relay coil will become de-energized, and that solenoid coil will become de-energized if the switch contact 83 is in the "start" position, and it will be kept de-energized if it was previously de-energized as that contact was permitted to shift to the "run" position. Thereafter, as long as the crankshaft rotates at a speed greater than the speed set by the movable contact of adjustable resistor 128, the solenoid coil 78 and the relay coil 180 will be kept de-energized, transistor 228 will be kept non-conducting, and diode 148 will be kept back-biased. The action of the Solenoid Disconnecting Circuit in keeping solenoid coil 78 de-energized while the generator 50 is providing welding power enables that circuit to act as a safety interlock citcuit. The continued de-energization of solenoid coil 78 is important; because it will prevent the destruction of battery 62 and the injury to the generator 50 which might occur if the contacts 76 were closed while that generator was developing welding power.

GENERATOR FIELD CIRCUIT

Current is supplied to the field winding 54 of generator 50 in one of two directions or polarities, as determined by the setting of a polarity-reversing switch 174 and by the positions of relay contacts 184 and 190. Specifically, if switch 174 is in the "reverse" position of FIG. 6B, current will flow from conductor 87 via contacts 162 and 164 and conductor 199 to and through field winding 54 to provide a positive polarity at brush 53—regardless of the positions of relay contacts 184 and 190. However, if switch 174 is in its "straight" position, current will flow from conductor 87 via relay contacts 186 and 184, switch contacts 166 and 164 to and through field winding 54 to provide a positive polarity at brush 53 if a relay coil 180 is energized, and current will flow from conductor 87 via relay contacts 188 and 190, switch contacts 172 and 170, conductor 193, the secondary winding of rate transformer 70, and conductor 197 to and through field winding 54 if relay coil 180 is de-energized.

The current which will flow through field winding 54 is variously supplied by a sub-circuit which includes Norton amplifier 136 in FIG. 6B, conductor 146, diode 148 in FIG. 6C, resistor 150, Norton amplifier 152, a resistor 154, NPN transistors 156 and 160, resistors 158 and 162, a conductor 176, contacts of switch 174, conductor 193, the secondary winding of rate transformer 70 in FIG. 6C, conductor 197, field winding 54 in FIG. 6B, conductor 199, conductor 87 and the contacts controlled by relay coil 180. A manually-operable switch 178 in FIG. 6C is connected in parallel with the secondary winding of rate transformer 70; and that switch is shown in its open position. Resistor 158 and conductor 87 connect the collector of transistor 156 to the "run-start" contact of switch 82 in FIG. 6B; and resistor 162 in FIG. 6C connects the emitter of that transistor to power ground. The emitter of transistor 160 is connected directly to power ground; and a large "heat sink" is provided for that transistor.

When conventional current flows from the "run-start" contact of switch 82 via conductor 87, stationary and movable contacts 162 and 164 of switch 174 in FIG. 6B, conductor 199, field winding 54, conductor 197, the secondary winding of rate transformer 70 in FIG. 6C, conductor 193, movable and stationary contacts 170 and 168 of switch 174 in FIG. 6B, conductor 176 and the collector-emitter circuit of transistor 160 in FIG. 6C to power ground, the polarity at brush 53 will be positive. However, when current flows from that "run-start" contact via conductors 87 and 194, stationary and movable relay contacts 188 and 190, stationary and movable contacts 172 and 170 of switch 174, conductor 193, the secondary winding of rate transformer 70 in FIG. 6C, conductor 197, field winding 54 in FIG. 6B, conductor 199, movable and stationary contacts 164 and 166 of switch 174, movable and stationary relay contacts 184 and 182, conductor 176, and the collector-emitter circuit of transistor 160 in FIG. 6C to power ground, the polarity at brush 53 will be negative. During "start up" of the engine 56, the logic "1" at the output of Norton amplifier 136 in FIG. 6B will cause Norton amplifier 152 in FIG. 6C to apply a logic "1" to the base of transistor 156; and that transistor and transistor 160 will be conductive at the saturation level. As many as four amperes can flow through field winding 54 in FIG. 6B during starting of the engine 56; and such a flow of current will enable that winding to develop a magnetic field which will interact with the magnetic field that is generated by armature 52 to effect rapid rotation of that armature. The resulting rotation of the crankshaft engine 56 will initiate starting of that engine.

The movable contacts 164 and 170 of polarity-reversing switch 174 in FIG. 6B are shown in "reverse" positions which enable the flow of current through field winding 54 to develop a positive voltage at brush 53, and hence at output terminals 64 and 66 in FIG. 6C. When those movable contacts are in their "straight" positions, wherein they engage stationary contacts 166 and 172 in FIG. 6B, they will tend to cause the flow of current through field winding 54 to provide a negative polarity at brush 53, and hence at the output terminals 64 and 66. Although a negative polarity at those terminals is required for some welding operations, such a polarity would be unacceptable during starting of the engine 56. The relay coil 180 in FIG. 6B permits the polarity of the voltage at brush 53 to be negative during some welding operations but will always keep that polarity positive during starting of the engine 56. Specifically, as long as the output of Norton amplifier 136 is a logic "1", as it will be until the engine crankshaft reaches a predetermined speed, that logic "1" will cause transistors 140 and 86 to conduct at the saturation level; and hence current will flow from the "run-start" contact of switch 82 via conductors 87 and 194, relay coil 180, junction 84 and the collector-emitter circuit of transistor 86 to ground to energize that relay coil. The resulting positioning of movable relay contacts 184 and 190 in engagement with relay contacts 186 and 192, and out of engagement with relay contacts 182 and 188, will permit conventional current flow only from field winding 54 to the secondary winding of rate transformer 70 and not vice versa, even if the operator of the welder leaves, or places, the movable contacts 164 and 170 in their "straight" positions. Specifically, current will flow from the "run-start" contact of switch 82 via conductors 87 and 194, stationary and movable relay contacts 186 and 184, stationary and movable contacts 166 and 164, conductor 199, field winding 54, conductor 197, the secondary winding of rate transformer 70 in FIG. 6C, conductor 193, movable and stationary contacts 170 and 172, movable and stationary relay contacts 190 and 192, conductor 176, and the collector-emitter circuit of transistor 160 in FIG. 6C to power ground. That current flow has the same direction, and causes the field winding 54 to produce the same polarity at brush 53, and hence at terminals 64 and 66, as the current flow which occurs when the movable contacts 164 and 170 are in their "reverse" positions. It thus should be apparent that regardless of the position in which the operator sets, or leaves, the polarity-reversing switch 174 during starting of the engine 56, the polarity at the brush 53 will be positive; and hence the generator 50 can act as a motor to start that engine. It would be undesirable to have relay coil 180 energized at any time other than during the time when engine 56 is being started. Consequently, that coil will become de-energized after the engine has reached a predetermined minimum speed, because the output of Norton amplifier 136 will then become a logic "0" and permit transistor 86 to become non-conductive and thereby de-energize relay coil 180.

A diode 195 in FIG. 6B has the anode thereof connected to conductor 194 and has the cathode thereof connected to conductor 79. As a result, that diode is connected between junction 81 and the "run-start" contact of switch 82. This is desirable; because it will enable that diode to dissipate any inductive surges which might develop between that junction and that contact as that switch was operated.

A diode 165 in FIG. 6C has the anode thereof connected to the movable contact 164 of switch 174 in FIG. 6B by conductor 199, and has the cathode thereof connected to conductor 79; and a diode 167 in FIG. 6C has the anode thereof connected to power ground, and has the cathode thereof connected to movable contact 164 by conductor 199. If the voltage at movable contact 164 tends to exceed the voltage on conductor 79 by more than about one-half to three-quarters of a volt, diode 165 will become conductive and will clamp the voltage at that movable contact to substantially the value of the voltage on conductor 79. On the other hand, if the voltage at movable contact 164 tends to drop below the value of power ground by more than about one-half to three-quarters of a volt, diode 167 will become conductive and will clamp the voltage at that movable contact to substantially the value of power ground. Consequently, diodes 165 and 167 will keep the voltage at movable contact 164 from rising appreciably above the value of the voltage on conductor 79 and from falling appreciably below the value of power ground.

A diode 169 in FIG. 6C has the anode thereof connected to the movable contact 170 of switch 174 in FIG. 6B by conductor 193, and has the cathode thereof connected to conductor 79; and a diode 171 has the anode thereof connected to power ground and has the cathode thereof connected to movable contact 170 by conductor 193. If the voltage at movable contact 170 tends to exceed the voltage on conductor 79 by more than about one-half to three-quarters of a volt, diode 169 will become conductive and will clamp the voltage at that movable contact to substantially the value of the voltage on conductor 79. On the other hand, if the voltage at movable contact 170 tends to drop below the value of power ground, diode 171 will become conductive and will clamp the voltage at that movable contact to substantially the value of power ground. Consequently, diodes 169 and 171 will keep the voltage at movable contact 170 from rising appreciably above the value of the voltage on conductor 79 and from falling appreciably below the value of power ground.

WELDING LEVEL CONTROL CIRCUIT

The amount of current which will be permitted to flow through the field winding 54 in FIG. 6B, and hence the amount of power which is developed by the generator 50, is a function of the conductivity of transistor 160 in FIG. 6C. The conductivity of that transistor is, in turn, a function of the conductivity of transistor 156. As pointed out hereinbefore, the output of Norton amplifier 152 in FIG. 6C controls the conductivity of transistor 156; and, during the starting of engine 56, that output is determined by the Solenoid Disconnecting Circuit. After that engine has been started, other sub-circuits will control the signal which is applied to the base of transistor 156; and hence those sub-circuits also will control the conductivity of transistor 160.

One of those sub-circuits includes Norton amplifiers 196 and 198 in FIG. 6C, a capacitor 200, and resistors 202, 204, 206, 208 and 210. That sub-circuit operates as a "chopper" oscillator; and it provides a generally-triangular wave form which is supplied to the non-inverting input of Norton amplifier 152 to cause that Norton amplifier to supply pulses to the base of transistor 156. The time intervals between those pulses are desirable, because they limit the duty cycle of transistor 156 and, importantly, limit the duty cycle of transistor 160. The limitation on the duty cycle of the latter transistor is great enough to enable the large heat sink which is associated with that transistor to hold the temperature of that transistor down to an acceptable level. Although the output of the chopper oscillator sub-circuit is a generally-triangular wave form, Norton amplifier 152 will provide pulses that have steep sides and that have widths which vary in accordance with any signals that are applied to the inverting input of that Norton amplifier. Although Norton amplifier 152 can respond to wave forms of different frequencies, it has been found that a generally-triangular wave form with a frequency of one thousand Hertz is very useful. Further sub-circuits which help determine the output of Norton amplifier 152 are the Hot Start Circuit, the Direct-Reading Command Circuit, the Current Feedback Circuit, the Voltage Feedback Circuit, and the Current-Voltage Feedback Circuit. Those sub-circuits are described hereinafter in appropriately-entitled sections.

HOT START CIRCUIT

A Norton amplifier 212 in FIG. 6C has the output thereof connected to the inverting input of Norton amplifier 152 by a diode 214 and a resistor 216. The inverting input of Norton amplifier 212 is connected to junction 105 by conductor 107, an adjustable resistor 218 and a resistor 220. An integrating capacitor 222 and a resistor 224 are connected between the output and input of Norton amplifier 212. A resistor 226 connects the non-inverting input of Norton amplifier 212 to a conductor 227 which extends to the Voltage Feedback Circuit in FIG. 6A. Pin 7 of Norton amplifier 212 is connected to signal ground; and pin 14 of that amplifier is connected to junction 105 by conductor 107.

DIRECT-READING COMMAND CIRCUIT

The numeral 234 in FIG. 6B denotes a regulator which is part of a three-digit, three thumbwheel, BCD switch 233; and the input of that regulator is connected to junction 105 by conductor 107. The "ground" terminal of that regulator is connected to signal ground, and also to the lower terminal of shunt 72, by a conductor 236. The output of that regulator is connected to one of two spaced terminals 242, a resistor 238, and to movable contacts 252, 254, 256, 258, 268, 270, 272, 274, 284, 286, 288 and 290 of that thumbwheel switch. The other terminal 242 is connected to the lower terminal of resistor 238 and to the base of a PNP transistor 246. Resistors 260, 262, 264, 266, 276, 278, 280, 282, 292, 294, 296 and 298, respectively, connect the collector of transistor 246 to stationary contacts 252, 254, 256, 258, 268, 270, 272, 274, 284, 286, 288 and 290 of that thumbwheel switch. A resistor 240 is connected between the base of transistor 246 and conductor 236; and spaced terminals 244 are connected in parallel with that resistor. A resistor 248 is connected between the collector of transistor 246 and conductor 236; and spaced terminals 250 are connected in parallel with that resistor. Trimming resistors can be connected across spaced terminals 242, 244 and 250 to compensate for variations in the voltage-setting capability of regulator 234 and in the resistive values of resistors 238, 240 and 248, respectively.

Resistors 260, 262, 264 and 266 are associated with the "hundreds" thumbwheel, resistors 276, 278, 280 and 282 are associated with the "tens" thumbwheel, and resistors 292, 294, 296 and 298 are associated with the "units" thumbwheel. When only contact 290 of the thumbwheel switch 233 is closed, the current flowing through resistor 298 and the emitter-collector circuit of transistor 246 will cause the welder to tend to supply one ampere of welding current to the electrode and workpiece when that welder is in its constant current mode and to supply one-tenth of a volt to that electrode and workpiece when that welder is in its constant voltage mode. Similarly, when only contact 288, 286, 284, 274, 272, 270, 268, 258, 256, 254 or 252 is closed, the current flowing through resistor 296, 294, 292, 282, 280, 278, 276, 266, 264, 262 or 260, respectively, will tend to be two, four, eight, ten, twenty, forty, eighty, one hundred, two hundred, four hundred and eight hundred amperes when that welder is in its constant current mode and to supply two-tenths, four-tenths, eight-tenths, one, two, four, eight, ten, twenty, forty and eighty volts to that electrode and workpiece when that welder is in its constant voltage mode. Proper setting of the three thumbwheels of switch 233 can establish a command for any desired value of current between one ampere and nine hundred and ninety-nine amperes.

It will be noted that the value of resistor 264 is more than a full decade below the value of resistor 280, it will be noted that the value of resistor 262 is more than a full decade below the value of resistor 278, and it will be noted that the value of resistor 260 is more than a full decade below the value of resistor 276. Further, it will be noted that the value of resistor 160 is less than, rather than being exactly, one-half of the value of resistor 262; and the value of resistor 264 is less than, rather than being exactly, one-half of the value of resistor 266. The less than one-half values of resistors 260, 262 and 264 compensate for the increased voltage drop which develops across the emitter-base circuit of transistor 246 at welding current levels in excess of close to two hundred amperes.

The voltage at the base of transistor 246 is fixed by resistors 238 and 240 and by any trimming resistors that are connected across the spaced terminals 242 and 244. The collector load will be fixed because it will consist of resistor 248 plus any trimming resistor that may be connected across the spaced terminals 250. However, the emitter load can be any one of a large number of predetermined values as selected by the settings of the thumbwheels of thumbwheel switch 233; and transistor 246 will respond to those various values of emitter load to be conductive at different levels of conductivity. The welder will respond to those different levels of conductivity to tend to supply welding current levels which exactly equal the visual digital reading provided by that thumbwheel switch when that welder is in its constant current mode and to supply voltages which are exactly one-tenth of that visual digital reading when that welder is in its constant voltage mode. In this way, the present invention is able to use inexpensive and compact components to set, and to visually check, precise levels of welding current and of welding voltage to be supplied by the welder.

MODE SELECTING CIRCUIT

The direct-reading command signal from the Direct-Reading Command Circuit is always modified by one or more feedback signals. Whenever a feedback signal is solely responsive to the value of the welding current, it is obtained from the shunt 72, whenever a feedback signal is solely responsive to the value of the welding voltage, it is obtained by sensing the voltage across the output terminals 66 and 68, and whenever a feedback signal is responsive to the value of the welding current and to the value of the welding voltage, it is obtained from the Current-Voltage Feedback Circuit which senses the outputs of the Current Feedback and Voltage Feedback Circuits.

The numeral 312 in FIG. 6A denotes a mode selecting switch that has three stationary contacts; and the upper of those contacts is connected to the Current Feedback Circuit, the lower of those contacts is connected to the Voltage Feedback Circuit, and the middle of those contacts is connected to the Current-Voltage Feedback Circuit which can provide a signal that is responsive to both the Current Feedback and Voltage Feedback Circuits. Conductor 313 in FIGS. 6A and 6B and resistors 314 and 318 in FIG. 6B connect the movable contact of switch 312 of FIG. 6A to the non-inverting input of an operational amplifier 302 in FIG. 6A. A capacitor 316 is connected between signal ground and the junction of those resistors; and that capacitor and resistor 314 will bypass high frequency transients to signal ground.

A conductor 300 and a resistor 304 in FIG. 6B connect the collector of transistor 246 of the Direct-Reading Command Circuit to the inverting input of amplifier 302. A capacitor 306 is connected between conductor 300 and signal ground to by-pass high frequency transients to signal ground. An integrating capacitor 310 and a resistor 308 are connected between the input and output of amplifier 302. That amplifier will respond to the signals applied to the inverting and non-inverting inputs thereof to provide an output which is a composite of the command signal from the Direct-Reading Command Circuit and of the signal from the mode-selecting switch 312. That output will be applied to a conductor 303 which extends from FIG. 6B into FIG. 6C.

CURRENT FEEDBACK CIRCUIT

Referring particularly to FIG. 6A, the numeral 325 generally denotes a Current Feedback Circuit. A resistor 328 and a capacitor 326 of that circuit are connected in parallel between signal ground and power ground, and are connected to the lower terminal of shunt 72 by conductor 236. That capacitor and resistor will tend to keep signal ground and power ground at the same potential despite high frequency and other transients.

The numerals 337, 340 and 356 denote operational amplifiers which are parts of the Current Feedback Circuit 325. The "grounding" pins of those amplifiers are connected to signal ground; and pins 4 of these amplifiers are connected to junction 105 by conductor 107. A resistor 330 and a capacitor 338 bypass to signal ground any high frequency transients which appear across the shunt 72 and which are applied to resistor 330 by a conductor 324. That conductor, that resistor, and a resistor 332 apply each signal at the upper end of shunt 72 in FIG. 6B to the inverting input of operational amplifier 340 in FIG. 6A. A resistor 342 connects the non-inverting input of that operational amplifier to signal ground; and a diode 344 and a resistor 334 connect the output of amplifier 340 to the inverting input of that amplifier. It will be noted that resistors 332 and 334 have the same values and are one percent resistors. This means that if the input to resistor 330 is negative, the signal at the cathode of diode 344 will be a positive value which is equal in magnitude to the signal at the input of resistor 330. Also, it means that if the input to resistor 330 is positive, the signal at the cathode of diode 344 will again be a positive value; because amplifier 340 will back-bias that diode and thereby permit resistors 332 and 334 to apply the positive signal from conductor 324 to the cathode of that diode. A resistor 336 applies signals at the cathode of diode 344 to the non-inverting input of amplifier 337.

To enable the value of the welding current supplied by output terminals 66 and 68 to match the values of current called for by the thumbwheel switch 233, the electric welder must develop precise current feedback signals. To make it possible to develop such signals, either the shunt 72 must have a precise predetermined value of resistance or the Current Feedback Circuit must be capable of being adjusted to be usable with a shunt which does not have that precise predetermined value of resistance. Because a large capacity shunt which has a precise predetermined value of resistance is very expensive, the Current Feedback Circuit of the present invention is made so it can develop precise current feedback signals even though it is used with a shunt that does not have a precise predetermined value of resistance.

An adjustable resistor 346 and a resistor 350 in FIG. 6A are connected between the output of amplifier 337 and signal ground to act as a voltage-dividing feedback loop for that amplifier; and a resistor 348 connects the junction between adjustable resistor 346 and resistor 350 to the inverting input of amplifier 337. Further the adjustable resistor 346 is selected so the maximum resistance thereof is about one-half of the resistance of resistor 350. The output of amplifier 337 is connected to the non-inverting input of amplifier 356, a resistor 352 is connected between that output and signal ground, and a resistor 358 is connected between the output of the latter amplifier and signal ground. A conductor connects the output of amplifier 356 to the inverting input of that amplifier to enable that amplifier to operate as a unity gain buffer.

To enable the value of the welding current supplied by output terminals 66 and 68 to match the values of current called for by the thumbwheel switch 233, when the welder is in its constant current mode, the Current Feedback Circuit should respond to a predetermined flow of current through shunt 72 to provide a predetermined voltage at the output of amplifier 356—even if the resistance of that shunt does not precisely meet a predetermined value. In the preferred embodiment of the present invention, the Current Feedback Circuit should respond to a flow of one ampere through shunt 72 to provide a voltage of five millivolts at the output of amplifier 356—even if the resistance of that shunt varies from a high of five thousandths (0.005) of an ohm to a low of thirty-four thousand, three hundred and seventy-five ten-millionths (0.003475) of an ohm. By making the maximum resistance of adjustable resistor 346 about one-half that of resistor 350—and in the said preferred embodiment, the maximum resistance of adjustable resistor 346 is one hundred kilohms and the resistance of resistor 350 is two hundred and twenty kilohms, the present invention enables that adjustable resistor and that resistor to vary the gain of amplifier 337 from unity to about one and one-half. If the resistance of a moderately-priced, commercially-available resistor which is to be used as the shunt 72 is five thousandths (0.005) of an ohm, the movable contact of adjustable resistor 346 will be set in its extreme right-hand position to provide unity gain for amplifier 337; and the Current Feedback Circuit will develop five millivolts at the output of amplifier 356 for each ampere of current flowing through shunt 72. If the resistance of a moderately-priced, commercially-available resistor which is to be used as the shunt 72 is thirty-four thousand, three hundred and seventy-five ten-millionths (0.0034375) of an ohm, the movable contact of adjustable resistor 346 will be set so the gain of amplifier 337 will be slightly greater than one and forty-five hundredths (1.45). If the resistance of a moderately-priced, commercially-available resistor which is to be used as the shunt 72 is greater than thirty-four thousand, three hundred and seventy-five ten-millionths (0.0034375) of an ohm but is less than five thousandths (0.005) of an ohm, the movable contact of adjustable resistor 346 will be set at a point between the settings corresponding to shunts having those values to provide five millivolts at the output of amplifier 356 when one ampere of current is flowing through shunt 72.

To set the movable contact of adjustable resistor 346, the thumbwheel switch 233 will be adjusted, regardless of the current being displayed thereby, until the ammeter 75 shows that one ampere of current is flowing through shunt 72. Thereupon, that movable contact will be shifted to the position wherein the voltage at the output of amplifier 356 is five millivolts.

The amplifier 356 applies its output to conductor 360 which extends to the upper contact of mode-selecting switch 312. When the movable contact is in engagement with that upper contact, the command signal from the Direct-Reading Command Circuit will be modified by a current feedback signal. All of this means that the Current Feedback Circuit of the present invention enables the value of welding current supplied by output terminals 66 and 68 to match the values of current called for by the thumbwheel switch 233 even though the resistance of the shunt may vary from a high of five thousandths (0.005) of an ohm to a low of thirty-four thousand, three hundred and seventy-five ten-millionths (0.0034375) of an ohm. As a result, the electric welder 10 can use a moderately-priced, commercially-available resistor as the shunt 72 and still provide precise current feedback.

VOLTAGE FEEDBACK CIRCUIT

The Voltage Feedback Circuit is generally denoted by the numeral 359 in FIG. 6A. That Circuit includes an operational amplifier 370 and an operational amplifier 376. A low value resistor 362 and a capacitor 372 are connected as a series filter to bypass to signal ground any high-frequency transients in the signal which is supplied to that resistor by a conductor 361 which extends from the output terminal 66 in FIG. 6C. Resistors 364 and 374 in FIG. 6A form a voltage divider for the signal which is developed at the upper terminal of capacitor 372; and the junction of those resistors is connected to the inverting input of amplifier 376. A diode 380 and a resistor 366 connect the output of that amplifier to the inverting input of that amplifier. The resistance of resistor 366 in one-twentieth that of resistor 364; and those resistors and resistor 374 are one percent resistors. A resistor 378 connects the non-inverting input of amplifier 376 to signal ground.

A resistor 368 connects the cathode of diode 380 to the non-inverting input of amplifier 370. A resistor 382 connects the output of that amplifier to the inverting input of that amplifier. A resistor 384 is connected between signal ground and the output of amplifier 370; and the conductor 227 also is connected to that output.

When the voltage at output terminal 66 in FIG. 6C is positive, conductor 361 and resistors 362, 364 and 366 in FIG. 6A will apply a positive voltage to the inverting input of amplifier 376. The resulting negative output of the amplifier will back-bias diode 380, and will thereby render the feedback loop of that amplifier inactive. The very small value of resistor 362 will enable substantially all of the voltage applied to that resistor to be dropped across resistors 364 and 374. Because the resistance of resistor 364 is two hundred kilohms whereas the resistance of resistor 374 is only ten and one-half kilohms, the voltage drop across resistor 364 will be only one-twentieth of the sum of the voltage drops across resistors 364 and 374. Resistors 366 and 378 will couple the voltage at the upper terminal of resistor 374 to the non-inverting input of amplifier 370. On the other hand, when the voltage at output terminal 64 in FIG. 6C is negative, conductor 361 and resistors 362, 364 and 374 in FIG. 6A will apply a negative voltage to the inverting input of amplifier 376. The resulting positive output of that amplifier will forward-bias diode 380, and will thereby cause that amplifier to tend to hold the inverting input thereof at virtual signal ground. This means that resistor 374 will have essentially the same voltages at the upper and lower terminals thereof, and hence can not provide a scaled-down voltage for the non-inverting input of amplifier 370. Instead, feedback resistor 366 will respond to the flow of feedback current therethrough to develop a positive voltage at the cathode of diode 380; and resistor 368 will apply that voltage to the non-inverting input of amplifier 370. Because the resistance of resistor 366 is one-twentieth of the resistance of resistor 364, the voltage which will be developed at the cathode of diode 380, and then will be supplied to that non-inverting input by resistor 368, will be one-twentieth of the voltage which conductor 361 supplies to resistor 362.

Amplifier 370 acts as a unity gain buffer; and hence that amplifier will cause conductor 386 to apply to the lower contact of mode-selecting switch 312 the same voltage that is applied to the non-inverting input of that amplifier. As indicated hereinbefore, the voltage which is applied to that non-inverting input will—whether the voltage which conductor 361 senses at output terminal 64 in FIG. 6C and applies to resistor 362 is positive or negative—be a positive voltage that is one-twentieth of the voltage at that output terminal. This means that when the movable contact of the mode-selecting switch is set in engagement with the lower contact of that switch, the command signal from the Direct-Reading Command Circuit will be modified by a positive voltage feedback signal which is one-twentieth of the value of the voltage across output terminals 66 and 68.

CURRENT-VOLTAGE FEEDBACK CIRCUIT

Some welding operations are best performed when the feedback signal for the welder includes both a voltage component and a current component; and the Current-Voltage Feedback Circuit of the present invention can provide a feedback signal which includes both of those components. That circuit is denoted by the numeral 387 in FIG. 6A; and it includes a potentiometer 319 which has one terminal thereof connected to the output of amplifier 356 of Current Feedback Circuit 325 by conductor 360 and which has the other terminal thereof connected to the output of amplifier 370 of Voltage Feedback Circuit 358 by conductor 386. The movable contact of that potentiometer is connected to the non-inverting input of an operational amplifier 390 by a resistor 398. Resistors 392 and 394 constitute a voltage divider which is connected between the regulated eight volts and signal ground by conductor 113. The junction between those resistors is connected to the inverting input of amplifier 390; and a resistor 396 connects the output of that amplifier to that input of that amplifier.

Resistor 396 has a value of eighty-two kilohms, resistor 392 has a value of six hundred and eighty kilohms, resistor 394 has a value of one hundred kilohms, and potentiometer 319 has a value of one hundred kilohms. The voltage drops across resistors 392 and 394 provide a one volt offset at the inverting input of amplifier 390. Also, those resistors simulate an input of eighty-two kilohms for that inverting amplifier; and, because resistor 396 has a value of eighty-two kilohms, amplifier 390 has a gain of two.

When the contact of potentiometer 319 is set in its middle position, any current feedback signal which is applied to the upper end thereof by conductor 360 will be attenuated to one-half of its value, and any voltage feedback signal which is applied to the lower end thereof by conductor 386 also will be attenuated to one-half of its value. The resulting signal which is applied to the non-inverting input of amplifier 390 will be doubled in value by that amplifier; and hence the signal at the output of amplifier 390 will have in it the same current feedback component which conductor 360 applied to potentiometer 319, and also will have in it the same voltage feedback component which conductor 386 applied to that potentiometer. It should be noted that because the Voltage Feedback Circuit provides a one to twenty scaling down of the voltage applied to resistor 362 by conductor 361, before that voltage is applied to conductor 386, the one volt offset at the inverting input of amplifier 370 corresponds to a twenty volt welding voltage at output terminal 66 in FIG. 6C.

The amplifier 390 will respond to various settings of the movable contact of potentiometer 319 to provide varying ratios of current feedback signals and voltage feedback signals and hence will provide varying "slopes" on a graph wherein welding voltage is plotted against welding current.

However, when that movable contact is in its center position, amplifier 390 and that movable contact will provide a "slope" of essentially forty-five degrees on a linear plot when a vertical scale of one volt has the same length as a horizontal scale of ten amperes. Also, when that movable contact is in its center position, the welder will, when the welding voltage is twenty volts, provide welding current values which precisely match the settings of the thumbwheel switch 233.

A resistor 400 and a conductor 404 connect the output of amplifier 390 to the center contact of mode-selecting switch 312. A capacitor 402 bypasses to signal ground any high frequency transients which pass through resistor 400. All of this means that when the movable contact of mode-selecting switch 312 is connected to the center contact of that switch, the command signal from the Direct-Reading Command Circuit will be modified by a combined current feedback and voltage feedback signal.

LOAD-SENSING CIRCUIT

Referring particularly to FIGS. 6A and 6B, the numeral 482 denotes a solenoid which selectively permits the throttle of engine 56 to be in its "idle" position or in a preset "full output" position. Although different solenoids could be used, one particularly useful solenoid is a step stage solenoid which has an internal switch 484. One terminal of that solenoid is connected to conductor 79; and the other terminal of that solenoid is connected to a junction 485. NPN transistors 474 and 476 constitute a Darlington amplifier which has its output connected to junction 485. A diode 478 and a capacitor 480 are connected in series between the upper terminal of solenoid 482 and power ground; and they will act as an energy-dissipating circuit. The junction between diode 478 and capacitor 480 is connected to junction 81 by conductor 79. The emitter of transistor 476 is connected to power ground.

The numeral 466 denotes a PNP transistor which has the emitter thereof connected to junction 105 by conductor 107, and which has the collector thereof connected to power ground by series-connected resistors 468, 470 and 472. Resistors 462 and 464 are connected in series between conductor 107 and a "jumper" 460 in FIG. 6A; and those resistors are selectively connected to a "full output" terminal 456 or to an "idle" terminal 458 in FIG. 6A by a conductor 488 and that "jumper".

The numerals 408 and 418 in FIG. 6A denote a resistor and capacitor which constitute a series filter that is connected between the output of operational amplifier 337 of the Current Feedback Circuit 325 and signal ground by a conductor 354. An operational amplifier 406, which is used as a comparator, has the non-inverting input thereof connected to the upper terminal of capacitor 418 by a resistor 410. A resistor 416 connects the inverting input of that operational amplifier to the midpoint of a voltage divider which includes resistors 412 and 414 and which is connected between the source of regulated eight volts and signal ground by conductor 113. The output of that operational amplifier is connected to one input of a NAND gate 430 by resistors 420 and 422 and junction 423. A manually-operated switch 424 and a resistor 426 can selectively connect junction 423 to junction 105 by conductor 107. A capacitor 428 is connected between junction 423 and power ground; and that capacitor and resistor 426 will bypass to ground any high frequency transients which might reach that resistor. When switch 424 is open, the voltage at junction 423 will largely be a function of the output of operational amplifier 406. The "grounding"

terminal of operational amplifier 406 is connected to signal ground; and the positive voltage terminal of that operational amplifier is connected to junction 105 by conductor 107.

The output of NAND gate 430 is connected to the upper input of a NAND gate 434; and the output of the latter NAND gate is connected directly to "full output" terminal 456, and also is connected by a resistor 454 to the upper input of NAND gate 436 and to the anode of a diode 452. The output of NAND gate 436 is connected to "idle" terminal 458 and to the lower input of NAND gate 434. A resistor 448 and a capacitor 449 are connected between junction 105 and signal ground by conductor 107; and the cathode of diode 452 is connected to the upper terminal of that capacitor. The transistor 228 has the collector-emitter circuit thereof connected across that capacitor; and a resistor 232 is connected between the base and emitter of that transistor. An adjustable resistor 438, a resistor 440, and parallel-connected capacitors 444 and 446 are connected between junction 105 and power ground by conductor 107. A capacitor 442 is connected between power ground and the junction between adjustable resistor 438 and resistor 440. A NAND gate 432 has the inputs thereof connected together and to the upper terminals of capacitors 444 and 446 and, by a diode 450, to the output of NAND gate 430. Pins 14 of NAND gates 430, 432, 434 and 436 are connected to junction 105 by conductor 107; and pins 7 of those NAND gates are connected to power ground.

Prior to the starting of engine 56, the base of transistor 228 in FIG. 6A will receive a logic "1" from Norton amplifier 136 in FIG. 6B via conductor 147 and resistor 230; and the resulting conductivity of that transistor will keep capacitor 449 discharged. The consequent logic "0's" at the lower input of NAND gate 430 and at the cathode of diode 452 will cause NAND gate 430 to develop a logic "1" at the output thereof and to apply it to the upper input of NAND gate 434, and will forward bias that diode to cause NAND gate 436 to "see" a logic "0" at its upper input and to respond to that logic "0" to develop a logic "1" at the output thereof and to apply it to the lower input of NAND gate 434 and to the "idle" terminal 458. NAND gate 434 will respond to the logic "1's" at its inputs to apply a logic "0" to the "full output" terminal 456. All of this means that before the engine 56 is started, logic "1" will appear at "idle" terminal 458 and logic "0" will appear at "full output" terminal 456.

Whenever the "jumper" 460 of FIG. 6A is set in engatement with the "idle" terminal 458, the Load-Sensing Circuit will cause the engine 56 to start running at its "idling" speed rather than at its "full output" speed as that engine is being started. Once that engine has been started, that Load-Sensing Circuit will continue to apply a signal to that "jumper" which will tend to cause that engine to operate at its "idling" speed rather than at its "full output" speed until the operator initiates a welding operation by causing the electrode to touch the workpiece. As that welding operation is initiated, the Load-Sensing Circuit will receive a signal from the Current Feedback Circuit which will automatically cause that Load-Sensing Circuit to apply a signal to "jumper" 460 which will cause engine 56 to operate at its "full output" speed; and it will keep that engine operating at that speed as long as that welding operation is continued. Moreover if, during that welding operation, the operator momentarily moves the electrode away from the workpiece, that Load-Sensing Circuit will, for a short length of time, continue to apply the signal to "jumper" 460 which will tend to keep the engine operating at its "full output" speed.

Specifically, as long as engine 56 is being started, the Solenoid Disconnecting Circuit will keep transistor 228 in FIG. 6A conductive; and the resulting logic "0's" at the lower input of NAND gate 430 and at the cathode of diode 452 will cause the Load-Sensing Circuit to apply a logic "1" to "jumper" 460—all as explained hereinbefore. Conductor 488 and resistor 464 will apply that logic "1" to the base of transistor 466 to keep that transistor non-conductive; and the resulting low voltage drops across resistors 470 and 472 will be unable to forward-bias the transistors 474 and 476 of the Darlington amplifier. Consequently, solenoid 482 will remain non-conductive, and will thereby permit engine 56 to start operating at its "idling" speed.

After that engine has begun to operate at its "idling" speed, the Solenoid Disconnecting Circuit will cause the output of Norton amplifier 136 to change from a logic "1" to a logic "0". Thereupon, transistor 228 will become nonconductive; and capacitor 449 can become charged and develop a logic "1" at its upper terminal. However, if a welding operation has not been initiated, the Current Feedback Circuit 325 will apply a logic "0" to the non-inverting input of operational amplifier 406 via conductor 354 and resistors 408 and 410; and that operational amplifier will respond to that logic "0" to apply a logic "0" to the upper input of NAND gate 430. As a result, even though the Solenoid Disconnecting Circuit changed the logic "1", which it had been supplying to transistor 228, to a logic "0", the Load-Sensing Circuit will continue to keep solenoid 482 de-energized—thereby causing engine 56 to continue to operate at its "idling" speed.

When the operator initiates a welding operation by causing the electrode to contact the workpiece, the Current Feedback Circuit will apply a logic "1" to the non-inverting input of operational amplifier 406 via conductor 354 and resistors 408 and 410. That operational amplifier will respond to that logic "1" to cause resistors 420 and 422 to change the logic "0" at the upper input of NAND gate 430 to a logic "1"; and that logic "1" plus the logic "1" which capacitor 449 applies to the lower input of that NAND gate will cause that NAND gate to change the logic "1" at its output to a logic "0". NAND gate 434 will respond to the resulting "0" at its upper input to apply a logic "1" to the upper input of NAND gate 436. The logic "0" at the output of NAND gate 430 will forward bias diode 450; and the resulting logic "0" at the inputs of NAND gate 432 will cause the latter NAND gate to apply a logic "1" to the lower input of NAND gate 436. Thereupon, the logic "1" at the "jumper" 460, and hence at the base of transistor 466 in FIG. 6B, will become a logic "0". The resulting conductivity of that transistor will energize solenoid 482, and will thereby cause engine 56 to operate at its "full output" speed. It thus should be apparent that once the engine 56 has begun to "run", the Load-Sensing Circuit will cause that engine to "run" at its "idling" speed until a welding operation is initiated, and will automatically cause that engine to "run" at its "full output" speed during a welding operation. Once the welding operation is concluded, the Current Feedback Circuit will again apply a logic "0" to the non-inverting input of operational amplifier 406 of the Load-Sensing Circuit; and the latter circuit will again cause engine 56 to run at its "idling" speed.

Throughout the duration of the welding operation, the diode 450 of the Load-Sensing Circuit will be forward-biased, and the voltage at the upper terminals of capacitors 444 and 446 of that circuit will be a logic "0". If the operator momentarily moves the electrode away from the workpiece, the output of the operational amplifier 337 in the Current Feedback Circuit 325 in FIG. 6A will decrease to zero volts; and the operational amplifier 406 in the Load-Sensing Circuit will respond to the resulting zero value at the non-inverting input thereof to apply a logic "0" to the upper input of NAND gate 430. Thereupon, the output of that NAND gate will become a logic "1", and it will back-bias the diode 450. The non-conductive state of that diode will tend to permit the voltage at the inputs of NAND gate 432 to rise; but adjustable resistor 438 and capacitors 442, 444 and 446 will constitute a R.C. network which will keep the voltage at those inputs from immediately rising to a value which wll correspond to a logic "1". By appropriately adjusting the position of the movable contact of that adjustable resistor, it is possible to keep logic "0" at the inputs of NAND gate 432 for from four to twenty seconds after the electrode has been moved away from the workpiece. By delaying the time when that NAND gate will change its output from a logic "0" to a logic "1", the Load-Sensing Circuit enables NAND gate 436 to continue to apply a logic "0" to the base of transistor 466, and thereby enables that transistor to keep solenoid 482 energized—with consequent operation of engine 56 at its "full output" speed. If the operator resumes the welding operation before the end of the pre-set delay of from four seconds to twenty seconds, the resulting logic "1" at the output of operational amplifier 337 in Current Feedback Circuit 325 will enable operational amplifier 406 and NAND gate 430 of the Load-Sensing Circuit to again develop a logic "0" at the output of that NAND gate—and hence at the cathode of diode 450. The renewed forward-biasing of that diode will continue to maintain logic "0" at the inputs of NAND gate 432 and it will discharge the capacitors 444 and 446. NAND gate 432 will apply a logic "1" to the lower input of NAND gate 436 to enable the latter NAND gate to continue to apply logic "0" to the base of transistor 416; and the discharged capacitors will insure a full time delay of from four seconds to twenty seconds when the electrode is next moved away from the workpiece. In this way, the Load-Sensing Circuit keeps momentary pauses in a welding operation from causing engine 56 to drop from its "full output" speed to its "idling" speed.

It should be noted that the resistor 448 and the capacitor 449 are useful in making certain that the Load-Sensing Circuit automatically applies a logic "1" to "jumper" 460 when the welder 10 is turned "on". Specifically, that capacitor will be in a discharged state prior to the time the welder is turned "on"; and that capacitor will not charge promptly as that welder is turned "on". In the first place, the Solenoid Disconnecting Circuit will keep transistor 228 conductive, and will thereby keep that capacitor "shorted", until the engine 56 is started; and, thereafter, the resistor 448 will limit the rate at which that capacitor can become charged. Throughout the time that capacitor is not charged, it will forward bias diode 452 to apply a logic "0" to the upper input of NAND gate 436; and the resulting logic "1" at the output of that NAND gate will keep transistor 466 in FIG. 6B non-conductive and will thereby keep solenoid 482 de-energized. All of this means that at turn "on", and until the engine 56 has been started, the Load-Sensing Circuit will keep solenoid 482 de-energized.

The NAND gates 430, 432, 434 and 436 act as a latch or flip-flop. At turn "on", those NAND gates will apply a logic "1" to "jumper" 460, and they will continue to apply that logic "1" to that "jumper" until the engine 56 has started and a weld has been initiated. Thereafter, those NAND gates will apply a logic "0" to that "jumper"; and they will continue to apply that logic "0" to that "jumper" until the welding operation has been interrupted for a period of time which is longer than the four second to twenty second time delay provided by adjustable resistor 438 and capacitors 442, 444 and 446.

In keeping the engine 56 operating at its "full output" speed for from four to twenty seconds after the electrode has been moved away from the workpiece, the Load-Sensing Circuit avoids the delays which would result if that engine dropped to its "idling" speed as soon as that electrode was moved away from that workpiece. Also, that Load-Sensing Circuit enables the operator of the welder 10 to make more uniform welds than he could make if the engine 56 dropped to its "idling" speed, and then had to increase its speed to the "full output" level, each time the electrode was moved away from the workpiece.

The switch 424, in the Load-Sensing Circuit of FIG. 6A, can be closed to cause the engine 56 to operate continuously at its "full output" speed. Specifically, when that switch is closed, it will apply a continuous logic "1" to the upper input of NAND gate 430; and that continuous logic "1" will coact with the continuous logic "1" which capacitor 449 applies to the lower input of that NAND gate to cause that NAND gate to develop a continuous logic "0" at its output. Diode 450 will respond to the resulting continuous logic "0" at its cathode to provide a continuous logic "0" at the inputs of NAND gate 432. That NAND gate will respond to those logic "0's", and NAND gate 434 will respond to the logic "0" at the upper input thereof, to apply continuous logic "1's" to the inputs of NAND gate 436. That NAND gate will then apply a continuous logic "0" to the base of transistor 466 in FIG. 6B—with consequent energization of solenoid 482 and with resulting "full output" speed operation of engine 56.

It should be noted that even where the switch 424 in FIG. 6A is closed to cause the engine 56 to operate continuously at "full output" speed, the resistor 448 and the capacitor 449 will cause the Load-Sensing Circuit to maintain a logic "1" at "jumper" 460 for a short period of time after that engine has started to "run". Specifically, until that engine is started, the transistor 228 will be kept conductive by the Solenoid Disconnecting Circuit and will keep capacitor 449 "shorted". Even after the engine 56 has been started, that capacitor will forward bias diode 452—and thereby keep logic "0" at the upper input of NAND gate 436, until that capacitor has become charged. As a result, the Load-Sensing Circuit of the present invention will keep the engine 56 from starting at its "full output" speed, and, instead, will require that engine to start at its "idling" speed.

If, as almost always will be the case, the engine 56 is an engine which tends to "run" at its "idling" speed and must have the throttle thereof moved to its "full output" position by solenoid 482 in FIG. 6B, the "jumper" 460 will be left in engagement with the "idle" terminal 458. However, in the unusual event the engine 56 is an engine which tends to "run" at its "full output" speed and must have the throttle thereof moved to its "idle" position by solenoid 482, the "jumper" 460 will be set in engagement with the "full output" terminal 456. In that event, the Load-Sensing Circuit would respond to the rendering of transistor 228 thereof conductive, by the Solenoid Disconnecting Circuit, to apply logic "0" to the base of transistor 466 in FIG. 6B via "full output" terminal 456, "jumper" 460, conductor 488, and resistor 464. As a result during "start up", that transistor would be conductive and the solenoid 482 would be energized, and hence would cause the engine 56 to operate at its "idling" speed. After that engine had started, and the Load-Sensing Circuit became able to respond to the signal which the Current Feedback Circuit 325 supplied via conductor 354, the former circuit would apply a logic "1" to the base of transistor 466 via "full output" terminal 456, "jumper" 460, conductor 488, and resistor 464. As a result, that transistor would be non-conductive and the solenoid 482 would be deenergized, and hence would cause the engine 56 to operate at its "full output" speed.

All of this means that the Load-Sensing Circuit of the present invention can be used with engines which tend to operate at "full output" speed as well as with engines which tend to operate at "idling" speed. In this way, that Load-Sensing Circuit makes the welder 10 quite versatile.

OPERATION OF WELDER

The welder provided by the present invention has some sub-circuits which are always connected across the battery 62; but those sub-circuits either do not draw any current, or draw so very little current, when the ignition switch 82 of FIGS. 3 and 6B is in its "off" position, that those sub-circuits do not constitute an unacceptable drain on that battery. Those sub-circuits include the alternator 60 of FIGS. 4 and 6B, the collector-emitter circuit of transistor 89 of FIG. 6C, Zener diode 91 and the base-emitter circuit of transistor 89 of FIG. 6C, Zener diode 91 and resistor 93 of FIG. 6C, diodes 165 and 167 of FIG. 6C, diodes 169 and 171 of FIG. 6C, diode 159 and the collector-emitter circuit of transistor 160 in FIG. 6C, capacitor 480 in FIG. 6B, diode 478 and the collector-emitter circuit of transistor 476 in FIG. 6B, diode 478 and the collector-emitter circuit of transistor 474 and the base-emitter circuit of transistor 476 in FIG. 6B, diode 478 and the collector-emitter circuit of transistor 474 and resistor 472 in FIG. 6B, diodes 90 and 88 in FIG. 6B, diode 90 and the collector-emitter circuit of transistor 86 in FIG. 6B, diode 195 in FIG. 6B and conductor 194 and the collector-emitter circuit of transistor 95 and then variously via capacitor 109 in FIG. 6C and via diode 103 and paralleled capacitor 101 and Zener diode 99 in FIG. 6C, diode 195 in FIG. 6B and conductor 194 and resistor 97 and the base-emitter circuit of transistor 95 and then variously via capacitor 109 in FIG. 6C and via diode 103 and paralleled capacitor 101 and Zener diode 99 in FIG. 6C, and diode 195 in FIG. 6B and conductor 194 and resistor 97 and then through parallel-connected Zener diode 99 and capacitor 101.

Diode 159 limits the voltage which can be applied to the collector of transistor 160 to less than one volt above the voltage at the positive terminal of battery 62. As a result, that diode protects that transistor against any potentially-hurtful transients which might develop as the relay contacts 184 and 190 moved or as the switch contacts 164 and 170 moved.

Before starting the engine 56, the operator should set the choke 26 on the front panel 12 to a desired setting, set the switch 424 of FIGS. 3 and 6A in its "open" position, set the desired value of welding current or voltage on the thumbwheel switch 233 of FIGS. 3 and 6B, set the mode-selecting switch 312 of FIGS. 3 and 6A in the desired position, set the movable contact of potentiometer 319 of FIGS. 3 and 6A, set switch 178 of FIGS. 3 and 6C in the desired position, and set the polarity-reversing switch 174 of FIGS. 3 and 6B in the desired position, plug the cable for the electrode into terminal 64 or 66 of FIGS. 3 and 6C, plug the cable for the workpiece clamp into terminal 68 of FIGS. 3 and 6C, insert the key into the ignition switch 82 of FIGS. 3 and 6B, and turn that ignition switch to its "start" position. As the movable contact 85 of that switch reaches the "run-start" contact, the fuse 80, the junction 81, those contacts, and conductor 87 will connect the positive terminal of battery 62 to contact 162 and the conductor 194 in FIG. 6B and to resistor 158 in FIG. 6C. The resulting flow of current from that "run-start" contact, via conductors 87 and 194, relay coil 180, junction 84, and the collector-emitter circuit of transistor 86 will energize that relay coil and shift relay contacts 184 and 190 out of engagement with relay contacts 182 and 188, respectively—thereby preventing any flow of current from the secondary winding of rate transformer 70 to field winding 54—even if the operator left the switch 174 in its "straight" position. Also, current will flow from the "run-start" contact via conductor 87 either through contacts 162 and 164, conductor 199, field winding 54, conductor 197, the secondary winding of rate transformer 70, conductor 193, contacts 170 and 168, conductor 176, and the collector-emitter circuit of transistor 160 to power ground or through relay contacts 186 and 184, contacts 166 and 164, conductor 199, field winding 54, conductor 197, the secondary winding of rate transformer 70, conductor 193, contacts 170 and 172, relay contacts 190 and 192, conductor 176 and the collector-emitter-circuit of transistor 160 to power ground. The Norton amplifier 152 of FIG. 6C will be responding to a logic "1" from the Solenoid Disconnecting Circuit to apply a logic "1" to the base of transistor 156; and hence saturation level current will flow from the "run-start" contact via conductor 87 and resistor 158 and the collector-emitter circuit of that transistor and resistor 162 to power ground. Thereupon, transistor 160 also will conduct at the saturation level.

Simultaneously, the Solenoid Disconnecting Circuit will be applying a logic "1" to the base of transistor 86. Consequently, when the movable contact 83 engages the "start" contact of switch 82, current will flow from those contacts via solenoid coil 78 and the collector-emitter circuit of transistor 86 to power ground. The resulting flow of current will energize that solenoid coil and enable it to close contacts 76. Thereupon, current will flow from the positive terminal of battery 62 via contacts 76, the armature 52, and shunt 72 to the negative terminal of that battery; and the magnetic field developed by that armature will coact with the magnetic field developed by field winding 54 to cause generator 50 to operate as a motor and rotate the crankshaft of engine 56 to start that engine.

As soon as that engine starts, and causes the speed of the crankshaft thereof to exceed a predetermined value, such as three hundred revolutions per minute, the Solenoid Disconnecting Circuit will cause transistor 86 to become non-conductive. Thereupon, relay coil 180 will be de-energized, solenoid coil 78 will be isolated from ground, transistor 228 in FIG. 6A will become non-conductive, and diode 148 in FIG. 6C will become back biased. The Load-Sensing Circuit will cause the engine 56 to "run" at its "idling" speed; and that speed will be greater than the predetermined speed at which the Solenoid Disconnecting Circuit renders transistor 86 non-conductive, de-energizes relay coil 180, isolates solenoid coil 78 from power ground, and back-biases diode 148 in FIG. 6C. A typical "idling" speed would be twelve hundred revolutions per minute. The de-energization of solenoid coil 78 will permit contacts 76 to re-open; and thereafter the generator 50 will operate as a generator rather than as a motor. The de-energization of relay coil 180 will permit the setting of switch 174 to determine whether a positive or a negative polarity appears at output terminals 64 and 66. The back-biasing of diode 148 in FIG. 6C will permit Norton amplifier 152 in FIG. 6C to respond to signals from the Hot Start Circuit, and the rendering of transistor 228 in FIG. 6A non-conductive will permit the Load-Sensing Circuit to sense and respond to the current which will pass through shunt 72 when a welding operation is initiated.

Prior to the time the welding electrode is applied to the workpiece, no current will flow through shunt 72; and hence the Current Feedback Circuit 325 of FIG. 6A will have zero volts applied to the non-inverting input of its operational amplifier 337. The resulting zero volts at the output of that operational amplifier will be applied to the Load-Sensing Circuit by conductor 354; and it will cause the engine 56 to "run" at its "idling" speed as it is started, all as explained hereinbefore. The interaction between the magnetic field of the field winding 54 and the turns of the armature 50 will cause the generator 50 to generate a voltage between output terminals 66 and 68.

If the movable contact of mode-selecting switch 312 is in its lower position it will receive a signal which the Voltage Feedback Circuit 359 will develop in response to the voltage across output terminals 66 and 68. That signal will be a positive voltage which will be one-twentieth the "absolute" value of the voltage across output terminals 66 and 68; and that signal will be applied to the non-inverting input of operational amplifier 302 in FIG. 6B by conductor 313 and resistors 314 and 318. That operational amplifier will respond to that signal and to the command signal from the Direct-Reading Command Circuit to develop a voltage-modified command signal; and conductor 303 and resistor 322 will apply that modified command signal to the inverting input of Norton amplifier 152 in FIG. 6C. The Hot Start Circuit also will be applying a signal to that inverting input; and Norton Amplifier 152 will respond to the sum of those signals to provide an output signal which will limit the conductivity of transistor 156, and hence of transistor 160 as well. As a result, when the operator initiates a welding operation, the initial value of welding current will be kept low enough to keep pits or holes from being formed in the workpiece. The value of the welding current which the Hot Start Circuit permits the generator 50 to supply to the electrode and workpiece can be adjusted by adjusting the position of the movable contact of adjustable resistor 218.

If the movable contact of mode-selecting switch 312 is in its upper position, that switch will apply zero volts to the non-inverting input of operational amplifier 302 in FIG. 6B via conductor 313 and resistors 314 and 318. The thumbwheel switch 233 will be applying a command signal to the inverting input of that operational amplifier; and hence that operational amplifier will apply a command signal to the inverting input of Norton amplifier 152 in FIG. 6C. The Hot Start Circuit also will be applying a signal to that inverting input; and Norton Amplifier 152 will respond to the sum of those signals to provide an output signal which will limit the conductivity of transistor 156, and hence of transistor 160 as well. As a result, when the operator initiates a welding operation, the initial value of welding current will be kept low enough to keep pits or holes from being formed in the workpiece.

If the movable contact of mode-selecting switch 312 is in its center position, it will receive a synthesized summation of the voltage which the Current Feedback Circuit applies to potentiometer 319, of the voltage which the Voltage Feedback Circuit applies to that potentiometer, and of a fixed one volt offset. That voltage will be positive, and it will be applied to the non-inverting input of operational amplifier 302 in FIG. 6B by conductor 313 and resistors 314 and 318. That operational amplifier will respond to that voltage and to the command signal from the Direct-Reading Command Circuit; and conductor 303 and resistor 322 will apply a resulting modified command signal to the inverting input of Norton amplifier 152 in FIG. 6C in much the same manner, and with much the same effect, as they apply a voltage-modified command signal to that input when the movable contact of mode-selecting switch 312 is in its lower position.

When the operator initiates a welding operation, by causing the electrode to touch the workpiece, welding current will—if switch 174 is in the "reverse" position shown by FIG. 6B—flow from brush 53 via conductor 69, the portion 73 of the primary winding of rate transformer 70, output terminal 66, the welding electrode, the workpiece, output terminal 68, conductor 67, and shunt 72 to the brush 55. The level of that current will be controlled by the value of the field winding current; and the Hot Start Circuit will keep that value at a desirably low level. Consequently, the welding operation can be initiated without the formation of pits and holes in the workpiece.

The IR drop across shunt 72, which will develop in response to that flow of welding current, will be applied by conductors 324 and 326 to the Current Feedback Circuit 325 in FIG. 6A. That circuit will respond to that IR drop to develop a voltage of five millivolts per ampere of welding current at the output of its operational amplifier 337; and conductor 354 will apply that voltage to the Load-Sensing Circuit. The consequent energization of solenoid 482 in FIG. 6B will cause the engine 56 to operate at its "full output" speed—and thereby enable generator 50 to provide full welding power. Also, as welding current starts to flow, the voltage across output terminals 66 and 68 will decrease; and the Voltage Feedback Circuit 359 of FIG. 6A will respond to that decreased voltage to develop a reduced voltage at the output of its operational amplifier 370. The application of that reduced voltage to the non-inverting input of Norton amplifier 212 of the Hot Start Circuit in FIG. 6C will permit the output of that Norton amplifier to back bias diode 214. Thereafter, until the electrode is moved away from the workpiece, the Hot Start Circuit will be effectively unable to apply a signal to the inverting input of Norton amplifier 152.

If the movable contact of mode-selecting switch 312 is in its lower position, it will receive a signal which the Voltage Feedback Circuit 359 will develop in response to the voltage across output terminals 66 and 68. That signal will be applied to the noninverting input of operational amplifier 302 in FIG. 6B by conductor 313 and resistors 314 and 318; and that operational amplifier will use that signal to modify the command signal from the thumbwheel switch 233. As a result, the Norton amplifier 152 in FIG. 6C will set a level of conductivity for transistors 156 and 160 which will enable generator 50 to maintain a voltage, across output terminals 66 and 68, which will match the setting of that thumbwheel switch.

If the movable contact of mode-selecting switch 312 is in its upper position, that contact will receive a signal from the Current Feedback Circuit 325 which corresponds to the voltage across shunt 72. That signal will be a positive voltage which will be in ratio of five millivolts to each ampere of current flowing through that shunt. That signal will be applied to the non-inverting input of operational amplifier 302 in FIG. 6B by conductor 313 and resistors 314 and 318. That operational amplifier will respond to that signal and to the command signal from the Direct-Reading Command Circuit to provide a current-modified command signal; and conductor 303 and resistor 322 will apply that modified command signal to the inverting input of Norton amplifier 152 in FIG. 6C. That Norton amplifier will then set levels of conductivity, for transistors 156 and 160, which will cause the current supplied by armature 52 to match the level set by thumbwheel switch 233.

If the movable contact of mode-selecting switch 312 is in its center position, that contact will receive a signal which, in part, is developed by the Voltage Feedback Circuit 359 and which, in part, is developed by the Current Feedback Circuit 325. That signal will be applied to the non-inverting input of operational amplifier 302 in FIG. 6B by conductor 313 and resistors 314 and 318. That operational amplifier will respond to that signal and to the command signal from the Direct-Reading Command Circuit to provide a command signal which is modified by current and by voltage. Whenever the voltage across output terminals 66 and 68 is twenty volts, the value of the welding current will precisely match the setting of thumbwheel switch 233.

As long as the operator continues to weld, the Current Feedback Circuit 325 will supply a signal to the Load-Sensing Circuit which will enable the latter circuit to cause solenoid 482 in FIG. 6B to operate engine 56 at its "full output" speed. At that speed, the generator 50 will supply sufficient power to enable the operator to weld indefinitely. However, if the operator moves the electrode away from the workpiece for more than twenty seconds, the Load-Sensing Circuit will de-energize solenoid 482 to permit the engine 56 to operate at its "idling" speed. Also, as the operator moves the electrode away from the workpiece, the voltage across the output terminals 66 and 68 will increase; and the Hot Start Circuit will respond to the resulting higher-value voltage from the Voltage Feedback Circuit 359 to forward bias diode 214 in FIG. 6C and again apply a signal to the inverting input of Norton Amplifier 152.

CONCLUSION

The rate transformer 70 performs a function which rate transformers have been known to perform in electric welders. Specifically, that rate transformer responds to changes in the value of the welding current to tend to change the value of the current flowing through field winding 54. That change in field winding current will tend to retard the changes in the value of the welding current, and hence will stabilize the flow of welding current.

The Solenoid Disconnecting Circuit senses the speed of the crankshaft of the engine 56 rather than the voltage across the output terminals 66 and 68; and hence that circuit provides an interlocking function which is precisely related to the crankshaft speed. If desired, however, other variables could be monitored to determine when the transistor 86 in FIG. 6B should become non-conductive and when the logic "1" on conductors 146 and 147 should change to logic "0". One of those variables is the change of direction of current flow through the shunt 72 as the crankshaft of engine 56 begins to rotate fast enough to cause the generator 50 to start functioning as a generator rather than as a starting motor. Another of those variables is the rate at which air enters the intake of that engine. A further one of those variables is the pressure on the lubrication oil for the engine; and yet another of those variables is the frequency of the output of generator 58. Irrespective of what variable is monitored to determine when the transistor 86 should become non-conductive and the logic "1" on conductor 146 and 147 should change to logic "0", the Solenoid Disconnecting Circuit will keep an operator of the welder from closing the contacts 76 while the generator 50 is providing welding power.

The switch 174 reverses the polarity at the output terminals 66 and 68 by reversing the direction of current flow through the field winding 54. The maximum value of the current which can flow through that field winding is very small in comparison to the maximum value of welding current which can be supplied by the welder 10. As a result, that welder can effect reversal of the polarity at the output terminals 64 and 66 without any need of the heavy and expensive reversing switches that frequently are used to switch the outputs of electric welders.

If desired the potentiometer 319, of the Current-Voltage Feedback Circuit in FIG. 6A, could be replaced by a fixed center-tapped resistor, or by a voltage divider which was made from a plurality of resistors. The resulting fixed voltage-current slope would not provide the versatility and flexibility that are provided by the potentiometer 319; but that fixed voltage-current slope would relieve the operator of the need of making decisions as to the types of slopes to be used.

If the engine speed were to fall below the "idling" level—as it could do in the event an unexpected and undesired load was applied to the output terminals 66 and 68, the Solenoid Disconnecting Circuit would automatically respond to the reduced number of pulses from the "breaker points" of that engine to cause Norton amplifier 136 to again apply a logic "1" to transistor 228 in FIG. 6A and to the non-inverting input of Norton amplifier 152 in FIG. 6C, and to the base of transistor 140 in FIG. 6B. Thereupon, the Load-Sensing Circuit would develop a logic "1" at the "jumper" 460 to call for operation of the engine 56 at its "idling" speed, the Norton amplifier 152 would call for maximum field winding current, relay coil 180 would make certain that the current flow through the field winding 54 would enable the generator 50 to act as a starting motor for that engine, and solenoid coil 78 would be connected to power ground. As a result, the operator could, as soon as he removed that unexpected and undesired load, shift the contacts 85 and 83 of switch 82 to start that engine. Similarly, when the operator "opens" switch 82, the welder will automatically pre-set the circuits which will enable actuation of that switch to re-start that engine.

The welder 10 can provide constant current welding operations such as TIG and stick welding operations. Also, that welder can provide constant voltage welding operations such as MIG welding operations. Further, that welder can provide welding operations at different values of voltage-current slope. That welder can provide all of those welding operations with high degree of precision. Moreover, that welder can use relatively inexpensive parts; and, in particular, can use a relatively-inexpensive, commercially-available shunt 72.

The Welding Level Control Circuit, the Generator Field Circuit, the mode-selecting Circuit and the Current Feedback Circuit or the Voltage Feedback Circuit or the Current-Voltage Feedback Circuit constitute a closed control loop which causes the welder 10 to supply welding power at precisely-maintained levels. As a result, that welder can provide better welds than can engine-driven welders which do not utilize closed loop control and, instead, use the compound windings of the generators thereof to control the welding power which they supply. Further, because the generator 50 of welder 10 is not a compound-wound generator, that welder can, when the engine thereof is operating at its "idling" speed, supply more than thirty percent of the power which it can supply when that engine is operating at its "full output" speed.

In the preferred embodiment of the present invention, the armature of generator 50 will be rotating at fifty-six hundred revolutions per minute when the engine 56 is operating at its "full output" speed of twenty-four hundred revolutions per minute. At such time, the welder 10 can deliver up to three hundred and seventy-five amperes at a welding voltage of thirty-five volts. That armature will be rotating at twenty-eight hundred revolutions per minute at no load. The engine has an "idling" speed of twelve hundred revolutions per minute. At that time, the welder 10 can deliver up to two hundred amperes at a welding voltage of about twenty volts. This means that the welder 10 can, while engine 56 is "idling", supply up to fifty-three percent of the maximum welding power which it can supply when that engine is operating at its "full output" speed. This is desirable, because it enables that welder to make very uniform welds—even where the command signal calls for large amounts of welding power.

The Hot Start Circuit, the Current Feedback Circuit, the Voltage Feedback Circuit, and the Current-Voltage Feedback Circuit, use the same logic, namely negative logic. The fact that all of those circuits use the same logic is desirable because it facilitates the modifying of the command signal supplied by the Direct-Reading Command Circuit, and also because it facilitates the summing of the signal from the Hot Start Circuit with the modified command signals from amplifier 302 in FIG. 6B.

Some of the features of the present invention are as usable in electric welders equipped with A.C. generators as they are usable in electric welders equipped with D.C. generators. Specifically, the Solenoid Disconnecting Circuit, the Generator Field Circuit, the Welding Level Control Circuit, the Hot Start Circuit, the Direct-Reading Command Circuit, the Mode-Selecting Circuit, and the Load-Sensing Circuit are usable in electric welders equipped with A.C. generators.

Whereas the drawing and accompanying description have shown and described a preferred embodiment of the present invention it should be apprent to those skilled in the art that various changes may be made in the form of the invention without affecting the scope thereof.

What we claim is:

1. An electric welder which comprises a D.C. generator, a command circuit that can develop a variable value command signal, a current feedback circuit, a voltage feedback circuit, a control circuit which receives said command signal from said command circuit and that can simultaneously respond to a signal from said current feedback circuit to provide a current-modified command signal which will be applied to the field winding of said D.C. generator, said field winding responding to said current-modified command signal to cause said electric welder to operate in a constant current mode, said control circuit being adapted to receive said command signal from said command circuit and to simultaneously respond to a signal from said voltage feedback circuit to provide a voltage-modified command signal which will be applied to said field winding of said D.C. generator, said field winding responding to said voltage-modified command signal to cause said electric welder to operate in a constant voltage mode, a voltage-current feedback circuit which receives said signal from said current feedback circuit and which simultaneously receives said signal from said voltage feedback circuit, said control circuit being adapted to receive said command signal from said command circuit and to simultaneously respond to a signal from said voltage-current feedback circuit to provide a voltage-current-modified command signal which will be applied to said field winding to said D.C. generator, said field winding responding to said voltage-current-modified command signal to cause said electric welder to operate in a slope mode, and mode-selecting means that selectively connects said current feedback circuit or said voltage feedback circuit or said voltage-current feedback circuit to said control circuit.

2. An electric welder which comprises a D.C. generator, a command circuit that can develop a variable value command signal, a current feedback circuit, a voltage feedback circuit, a control circuit which receives said command signal from said command circuit and that can simultaneously respond to a signal from said current feedback circuit to provide a current-modified command signal which will be applied to the field winding of said D.C. generator, said field winding responding to said current-modified command signal to cause said electric welder to operate in a constant current mode, said control circuit being adapted to receive said command signal from said command circuit and to simultaneously respond to a signal from said voltage feedback circuit to provide a voltage-modified command signal which will be applied to said field winding of said D.C. generator, said field winding responding to said voltage-modified command signal to cause said electric welder to operate in a constant voltage mode, a voltage-current feedback circuit which receives said signal from said current feedback circuit and which simultaneously receives said signal from said voltage feedback circuit, said control circuit being adapted to receive said command signal from said command circuit and to simultaneously respond to a signal from said voltage-current feedback circuit to provide a voltage-current-modified command signal which will be applied to said field winding of said D.C. generator, said field winding responding to said voltage-current-modified command signal to cause said electric welder to operate in a slope mode, mode-selecting means that selectively connects said current feedback circuit or said voltage feedback circuit or said voltage-current feedback circuit to said control circuit, said D.C. generator being adapted to develop a positive voltage or a negative voltage at an output thereof, means to enable said D.C. generator to selectively develop said positive voltage or said negative voltage at said output thereof, a subcircuit means that enables said current feedback circuit to provide a current feedback signal of a given polarity when said D.C. generator is developing said positive voltage at said output thereof and to provide a current feedback signal of said given polarity when said D.C. generator is developing said negative voltage at said output thereof.

3. An electric welder which comprises a D.C. generator, a command circuit that can develop a variable value command signal, a current feedback circuit, a voltage feedback circuit, a control circuit which receives said command signal from said command circuit and that can simultaneously respond to a signal from said current feedback circuit to provide a current-modified command signal which will be applied to the field winding of said D.C. generator, said field winding responding to said current-modified command signal to cause said electric welder to operate in a constant current mode, said control circuit being adapted to receive said command signal from said command circuit and to simultaneously respond to a signal from said voltage feedback circuit to provide a voltage-modified command signal which will be applied to said field winding of said D.C. generator, said field winding responding to said voltage-modified command signal to cause said electric welder to operate in a constant voltage mode, a voltage-current feedback circuit which receives said signal from said current feedback circuit and which simultaneously receives said signal from said voltage feedback circuit, said control circuit being adapted to receive said command signal from said command circuit and to simultaneously respond to a signal from said voltage-current feedback circuit to provide a voltage-current-modified command signal which will be applied to said field winding of said D.C. generator, said field winding responding to said voltage-current-modified command signal to cause said electric welder to operate in a slope mode, mode-selecting means that selectively connects said current feedback circuit or said voltage feedback circuit or said voltage-current feedback circuit to said control circuit, said D.C. generator being adapted to develop a positive voltage or a negative voltage at an output thereof, and means to enable said D.C. generator to selectively develop said positive voltage or said negative voltage at said output thereof, a subcircuit means that enables said voltage feedback circuit to provide a voltage feedback signal of a given polarity when said D.C. generator is developing said positive voltage at said output thereof and to provide a voltage feedback signal of said given polarity when said D.C. generator is developing said negative voltage at said output thereof.

4. An electric welder which comprises a D.C. generator, said D.C. generator being adapted to develop a positive voltage or a negative voltage at an output thereof, selective means to enable said D.C. generator to selectively develop said positive voltage or said negative voltage at said output thereof, a command circuit that can develop a variable value command signal, a current feedback circuit, a subcircuit means that enables said current feedback circuit to provide a current feedback signal of a given polarity when said D.C. generator is developing said positive voltage at said output thereof and to provide a current feedback signal of said given polarity when said D.C. generator is developing said negative voltage at said output thereof, a voltage feedback circuit, a subcircuit means enabling said voltage feedback circuit to provide a voltage feedback signal of a given polarity when said D.C. generator is developing said positive voltage at said output thereof and to provide a voltage feedback signal of said given polarity when said D.C. generator is developing said negative voltage at said output thereof, a control circuit which receives said command signal from said command circuit and that can simultaneously respond to a signal from said current feedback circuit to provide a current-modified, command signal which will cause said electric welder to operate in a constant current mode, said control circuit being adapted to receive said command signal from said command circuit and to simultaneously respond to a signal from said voltage feedback circuit to provide a voltage-modified command signal which will cause said electric welder to operate in a constant voltage mode, and mode-selecting means that selectively connects said current feedback circuit or said voltage feedback circuit to said control circuit.

5. An electric welder which comprises output terminals, a D.C. generator that can selectively develop a positive voltage or a negative voltage at one of said output terminals, an energizing circuit for the field winding of said D.C. generator, a polarity-controlling switch that can be set in one position to enable said energizing circuit to cause current to flow through said field winding in a direction which will enable said D.C. generator to develop said positive voltage at said one output terminal, said polarity-controlling switch being adapted to be set in a second position to enable said energizing circuit to cause current to flow through said field winding in the opposite direction and thereby enable said D.C. generator to develop said negative voltage at said one output terminal, a command circuit that can develop a variable value command signal, a current feedback circuit, a control circuit which receives said command signal from said command circuit and that can simultaneously respond to a signal from said current feedback circuit to provide a current-modified command signal which will be applied to the field winding of said D.C. generator, said field winding responding to said current-modified command signal to cause said electric welder to operate in a constant current mode, a subcircuit means that enables said current feedback circuit to provide a current feedback signal of a given polarity when said D.C. generator is developing said positive voltage at said one output terminal and to provide a current feedback signal of said given polarity when said D.C. generator is developing said negative voltage at said one output terminal.

6. An electric welder as claimed in claim 5 wherein a voltage feedback circuit supplies a signal to said control circuit, wherein said control circuit receives said command signal from said command circuit and can simultaneously respond to a signal from said voltage feedback circuit to provide a voltage-modified command signal which will be applied to the field winding of said D.C.

generator, wherein said field winding responds to said voltage-modified command signal to cause said electric welder to operate in a constant voltage mode, wherein mode-selecting means selectively connects said current feedback circuit or said voltage feedback circuit to said control circuit, wherein a subcircuit means enables said voltage feedback circuit to provide a voltage feedback signal of said given polarity when said D.C. generator is developing said positive voltage at said one output terminal and to provide a voltage feedback signal of said given polarity when said D.C. generator is developing said negative voltage at said one output terminal.

7. An electric welder which comprises output terminals, a D.C. generator that can selectively develop a positive voltage or a negative voltage at one of said output terminals, an energizing circuit for the field winding of said D.C. generator, a polarity-controlling switch that can be set in one position to enable said energizing circuit to cause current to flow through said field winding in a direction which will enable said D.C. generator to develop said positive voltage at said one output terminal, said polarity-controlling switch being adapted to be set in a second position to enable said energizing circuit to cause current to flow through said field winding in the opposite direction and thereby enable said D.C. generator to develop said negative voltage at said one output terminal, a command circuit that can develop a variable value command signal, a voltage feedback circuit, a control circuit which receives said command signal from said command circuit and that can simultaneously respond to a signal from said voltage feedback circuit to provide a voltage-modified command signal which will be applied to the field winding of said D.C. generator, said field winding responding to said voltage-modified command signal to cause said electric welder to operate in a constant voltage mode, a subcircuit means that enables said voltage feedback circuit to provide a voltage feedback signal of a given polarity when said D.C. generator is developing said positive voltage at said one output terminal and to provide a voltage feedback signal of said given polarity when said D.C. generator is developing said negative voltage at said one output terminal.

8. An electric welder which comprises output terminals, a generator that can selectively develop a positive voltage or a negative voltage at one of said output terminals, an energizing circuit for the field winding of said generator, a polarity-controlling switch that can be set in one position to enable said energizing circuit to cause current to flow through said field winding in a direction which will enable said generator to develop said positive voltage at said one output terminal, said polarity-controlling switch being adapted to be set in a second position to enable said energizing circuit to cause current to flow through said field winding in the opposite direction and thereby enable said generator to develop said negative voltage at said one output terminal, a command circuit that can develop a variable value command signal, a control circuit which receives said variable value command signal from said command circuit to provide a command signal which will determine the value of the current flowing through said field winding of said generator, and a Hot Start circuit which selectively supplies a current-limiting signal of a fixed polarity to said control circuit which will cause said control circuit to respond to said signal from said Hot Start circuit rather than to said command signal from said command circuit and hence will limit the value of welding current which can be supplied by said output terminals during the initiation of a welding operation to a value corresponding to said signal from said Hot Start circuit regardless of the polarity of said voltage at said one output terminal and also regardless of the value of said command signal supplied by said command circuit.

9. An electric welder as claimed in claim 8 wherein a feedback circuit senses the initiation of a welding operation, wherein the output of said feedback circuit is connected to said control circuit, wherein the output of said control circuit is connected to said polarity-controlling switch whereby said control circuit is connected between said feedback circuit and said polarity-controlling switch, wherein said control circuit can simultaneously respond to said command signal from said command circuit and to a feedback signal from said feedback circuit to supply a feedback-modified command signal to said control circuit, and wherein the output of said Hot Start circuit is connected between said feedback circuit and said polarity-controlling switch.

10. An electric welder which comprises a generator, an internal combustion engine coupled to said generator to drive the armature of said generator, a command circuit which can be set to provide a predetermined command signal, a load-sensing circuit that selectively permits said internal combustion engine to operate at idling speed or causes said internal combustion engine to operate at a higher speed, and a servo system which can sense a condition of the welds to be performed by said welder to vary the current flowing through the field winding of said generator and thereby cause the output of said electric welder to perform said welds in the manner called for by said command signal from said command circuit, said servo system including a feedback circuit which senses said condition of said welds to develop a feedback signal, and means responding to said feedback signal and to said command signal to enable said current flowing through said field winding of said generator to cause the output of said electric welder to perform said welds in the manner called for by said command signal from said command circuit, said load-sensing circuit being connected to said feedback circuit and responding to a predetermined signal from said feedback circuit to cause said internal combustion engine to operate at said higher speed, and said feedback circuit providing said predetermined signal whenever said output of said electric welder is performing a weld, whereby said internal combustion engine will drive said armature at said higher speed to enable said generator to provide welding power and said feedback signal and said command signal will provide the level of welding power called for by said command signal from said command circuit.

* * * * *